US008756519B2

(12) United States Patent  (10) Patent No.: US 8,756,519 B2
Hunt et al.  (45) Date of Patent: Jun. 17, 2014

(54) TECHNIQUES FOR SHARING CONTENT ON A WEB PAGE

(75) Inventors: Martin Hunt, Mountain View, CA (US); Chris Szeto, San Jose, CA (US)

(73) Assignee: Google Inc., Mountain View, CA (US)

( * ) Notice: Subject to any disclaimer, the term of this patent is extended or adjusted under 35 U.S.C. 154(b) by 644 days.

(21) Appl. No.: 12/558,304

(22) Filed: Sep. 11, 2009

(65) Prior Publication Data

US 2010/0070899 A1  Mar. 18, 2010

Related U.S. Application Data

(60) Provisional application No. 61/096,705, filed on Sep. 12, 2008.

(51) Int. Cl.
*G06F 3/048* (2013.01)
*G06F 3/0486* (2013.01)

(52) U.S. Cl.
USPC ............................ 715/769; 715/823; 715/760

(58) Field of Classification Search
CPC ............................... G06F 3/048; G06F 3/0486
USPC ......................................... 715/769, 823, 760
See application file for complete search history.

(56) References Cited

U.S. PATENT DOCUMENTS

| | | | |
|---|---|---|---|
| 5,721,763 A | 2/1998 | Joseph et al. | |
| 7,587,450 B2 | 9/2009 | Morris | |
| 7,716,687 B2 * | 5/2010 | Bales et al. | 719/329 |
| 7,853,881 B1 | 12/2010 | Assal et al. | |
| 7,904,500 B1 | 3/2011 | Anderson | |
| 8,046,259 B1 | 10/2011 | Siegel et al. | |
| 8,595,295 B2 * | 11/2013 | Wherry et al. | 709/204 |
| 2003/0001846 A1 | 1/2003 | Davis et al. | |
| 2003/0018747 A1 | 1/2003 | Herland et al. | |
| 2003/0195801 A1 | 10/2003 | Takakura et al. | |
| 2004/0215708 A1 | 10/2004 | Higashi et al. | |
| 2004/0255233 A1 * | 12/2004 | Croney et al. | 715/500 |
| 2005/0086605 A1 | 4/2005 | Ferrer et al. | |
| 2005/0108299 A1 * | 5/2005 | Nakajima | 707/201 |
| 2005/0114204 A1 | 5/2005 | Kim et al. | |

(Continued)

FOREIGN PATENT DOCUMENTS

| | | |
|---|---|---|
| WO | WO 2008/005948 A2 | 1/2008 |
| WO | WO 2009/149466 A1 | 12/2009 |
| WO | WO 2009/149468 A1 | 12/2009 |

OTHER PUBLICATIONS

Preliminary Report on Patentability for Application No. PCT/US2009/046651, mailed on Dec. 6, 2010, 4 pages.

(Continued)

*Primary Examiner* — Daeho Song
(74) *Attorney, Agent, or Firm* — Patent Law Works LLP

(57) ABSTRACT

Techniques that enable content from a web page to be shared directly with one or more targets, which may be an application, a buddy from a buddy list (e.g., in a chat application), and the like. An embodiment of the present invention can identify contents on a web page that are to be made sharable and make the identified contents sharable. The content that is made sharable can then be shared with a share target using, for example, drag and drop operations. For example, a user may select sharable content on a web page, drag the content to a target, and drop it directly on the target thereby sharing the content with the target.

20 Claims, 18 Drawing Sheets

(56) References Cited

U.S. PATENT DOCUMENTS

| | | | |
|---|---|---|---|
| 2005/0131992 | A1 | 6/2005 | Goldstein et al. |
| 2005/0246651 | A1* | 11/2005 | Krzanowski ............... 715/770 |
| 2005/0266835 | A1 | 12/2005 | Agrawal et al. |
| 2006/0074769 | A1 | 4/2006 | Looney et al. |
| 2006/0095530 | A1 | 5/2006 | Daniell et al. |
| 2006/0116139 | A1 | 6/2006 | Appelman |
| 2007/0006089 | A1* | 1/2007 | Bales et al. ............... 715/769 |
| 2007/0143439 | A1 | 6/2007 | Szabo et al. |
| 2007/0203917 | A1 | 8/2007 | Du et al. |
| 2007/0220106 | A1 | 9/2007 | Reisman |
| 2007/0234226 | A1 | 10/2007 | Szeto |
| 2007/0281607 | A1 | 12/2007 | Bucher et al. |
| 2007/0282621 | A1 | 12/2007 | Altman et al. |
| 2008/0091517 | A1 | 4/2008 | Koonce et al. |
| 2008/0126484 | A1 | 5/2008 | Wherry et al. |
| 2008/0133501 | A1* | 6/2008 | Andersen et al. ............... 707/5 |
| 2008/0140800 | A1* | 6/2008 | Farber et al. ............... 709/214 |
| 2008/0168048 | A1* | 7/2008 | Bell et al. ............... 707/5 |
| 2008/0172288 | A1* | 7/2008 | Pilskalns et al. ............... 705/10 |
| 2008/0270915 | A1* | 10/2008 | Tevanian et al. ............... 715/751 |
| 2008/0281793 | A1* | 11/2008 | Mathur ............... 707/3 |
| 2009/0037517 | A1* | 2/2009 | Frei ............... 709/202 |
| 2009/0307082 | A1 | 12/2009 | Raghunathan et al. |
| 2009/0307089 | A1 | 12/2009 | Binnewies |
| 2009/0307325 | A1 | 12/2009 | Szeto |
| 2010/0017412 | A1* | 1/2010 | Horowitz et al. ............... 707/10 |

OTHER PUBLICATIONS

Preliminary Report on Patentability for Application No. PCT/US2009/046653, mailed on Dec. 6, 2010, 5 pages.
Preliminary Report on Patentability for Application No. PCT/US2009/046663, mailed on Dec. 6, 2010, 6 pages.
Non-Final Office Action for U.S. Appl. No. 12/480,622, mailed on Dec. 2, 2010, 11 pages.
Webpages downloaded from http://www.yoono.com/, printed on Sep. 10, 2009, 15 pages.
International Search Report of the International Searching Authority for Application No. PCT/US2007/072687, mailed on Jul. 29, 2008, 5 pages.
Written Opinion of the International Searching Authority for Application No. PCT/US2007/072687, mailed on Jul. 29, 2008, 3 pages.
International Preliminary Report on Patentability for Application No. PCT/US2007/072687, mailed on Jan. 15, 2009, 5 pages.
International Search Report of the International Searching Authority for Application No. PCT/US2009/046651, mailed on Jul. 23, 2009, 3 pages.
Written Opinion of the International Searching Authority for Application No. PCT/US2009/046651, mailed on Jul. 23, 2009, 3 pages.
International Search Report of the International Searching Authority for Application No. PCT/US2009/046653, mailed on Jul. 21, 2009, 3 pages.
Written Opinion of the International Searching Authority for Application No. PCT/US2009/046653, mailed on Jul. 21, 2009, 4 pages.
International Search Report of the International Searching Authority for Application No. PCT/US2009/046663, mailed on Dec. 30, 2009, 2 pages.
Written Opinion of the International Searching Authority for Application No. PCT/US2009/046663, mailed on Dec. 30, 2009, 5 pages.
Non-Final Office Action for U.S. Appl. No. 11/772,745, mailed on Apr. 1, 2011, 19 pages.
IBM TDB, "Advertising System for Electronic Chat Environments," ip.com, Prior Art Database, Technical Disclosure, Original Publication Date Aug. 18, 2002, ip.com Electronic Publication Date Jun. 21, 2003, 7 pages.
Final Office Action for U.S. Appl. No. 12/480,622, mailed on Sep. 7, 2011, 16 pages.
Non-Final Office Action for U.S. Appl. No. 12/480,643, mailed on Jul. 8, 2011, 13 pages.
Non-Final Office Action for U.S. Appl. No. 12/480,671, mailed on Jul. 20, 2011, 12 pages.
Final Office Action for U.S. Appl. No. 11/772,745, mailed on Oct. 3, 2011, 10 pages.
Final Office Action for U.S. Appl. No. 12/480,671, mailed Dec. 1, 2011, 17 pages.
Final Office Action for U.S. Appl. No. 12/480,643, mailed Jan. 23, 2012, 15 pages.
Advisory Action U.S. Appl. No. 12/480,671, mailed Feb. 16, 2012, 3 pages.

* cited by examiner

TECHNIQUES FOR SHARING CONTENT ON A WEB PAGE

CROSS-REFERENCES TO RELATED APPLICATIONS

The present application is a non-provisional of and claims the benefit and priority under 35 U.S.C. 119(e) of U.S. Provisional Application No. 61/096,705 filed Sep. 12, 2008, entitled METHOD FOR SHARING CONTENT ON A WEBPAGE THROUGH EMBEDDED INSTANT MESSAGING, the entire contents of which are incorporated herein by reference for all purposes.

BACKGROUND OF THE INVENTION

Embodiments of the present invention relate to sharing of information, and more particularly to techniques for sharing content from a web page.

Web pages contain content of different types including text, images, video, flash, advertisements, embedded content, and the like. However, in spite of advances in web page content, the ability to easily share the content is still not available. For example, if a user wants to share an image displayed on a web page with a friend the user is having a conversation with in an instant messaging (IM) chat client, the user has to first store the image from the web page as a file on the user's computer. The user then has to select the stored file and send the file to the friend. This is quite cumbersome. Accordingly, better techniques for sharing web page content are desired. In another example, if a user wants to send this page to another friend in an instant messenger, the user must copy the URL from the address bar and then paste the URL into an IM window. Accordingly, better techniques for sharing web page content are desired.

BRIEF SUMMARY OF THE INVENTION

Embodiments of the present invention enable content from a web page to be shared directly with one or more targets, which may be an application, a buddy from a buddy list (e.g., in a chat application), and the like. Techniques are described that can identify contents on a web page that are to be made sharable and make the identified contents sharable. The content that is made sharable can then be shared with a share target using, for example, drag and drop operations. For example, a user may select sharable content on a web page, drag the content to a target, and drop it directly on the target thereby sharing the content with the target.

According to an embodiment of the present invention, a first content element that is to be made sharable is identified from a set of content elements contained by a web page loaded in a browser. The identified first content element is then made sharable. In one embodiment, first content element is made sharable by enabling the first content element to be dragged and dropped onto a target.

Various different techniques may be used to identify content that is to be made sharable. In one embodiment, the web page is scanned to identify a first set of one or more tags, each tag corresponding to a content element of the web page to be made sharable. The first set of tags may include a first tag corresponding to the first content element that is identified and made sharable. For each tag in the first set of tags, it is determined whether selection criteria corresponding to the tag is satisfied based upon attributes of the tag. A tag is selected from the first set of tags only upon determining that selection criteria corresponding to the tag is satisfied based upon one or more attributes of the tag. For each selected tag, the content element corresponding to the selected tag is made sharable.

Various different display techniques may be used to enable a user to easily identify web page content that has been made sharable. In one embodiment, the content element that is made sharable may be visually highlighted, for example, using borders, tooltips, etc.

Web page content that has been made sharable can be shared with one or more targets. In one embodiment, upon detecting that a sharable content element has been shared with a target, information is provided to the target that enables the target to access, view, or interact with the shared content element. In one embodiment, the information provided to the target comprises a uniform resource locator (URL) that enables the target to access the shared content element.

The targets with which content may be shared can be of different types. For example, the target may be an element of an instant messaging application. Upon detecting that content has been shared with an element of an instant messaging application, a message may be sent to an entity (e.g., a friend, a buddy) corresponding to the element of the instant messaging application that enables the entity to access, view, or interact with the first content element.

In one embodiment, code may be associated with a web page that enables one or more of the web page contents to the identified and made sharable.

The foregoing, together with other features and embodiments will become more apparent upon referring to the following specification, claims, and accompanying drawings.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Embodiments of the present invention enable content from a web page to be shared directly with one or more targets, which may be an application (e.g. Facebook, Twitter, Email, or even a Shopping Cart), a buddy from a buddy list (e.g., in a chat application), and the like. Techniques are described that can identify contents on a web page that are to be made sharable and make the identified contents sharable. The content that is made sharable can then be shared with a share target using, for example, drag and drop operations. For example, a user may select a sharable content on a web page, drag the content to a target, and drop it directly on the target thereby sharing the content with the target.

Figure 1:
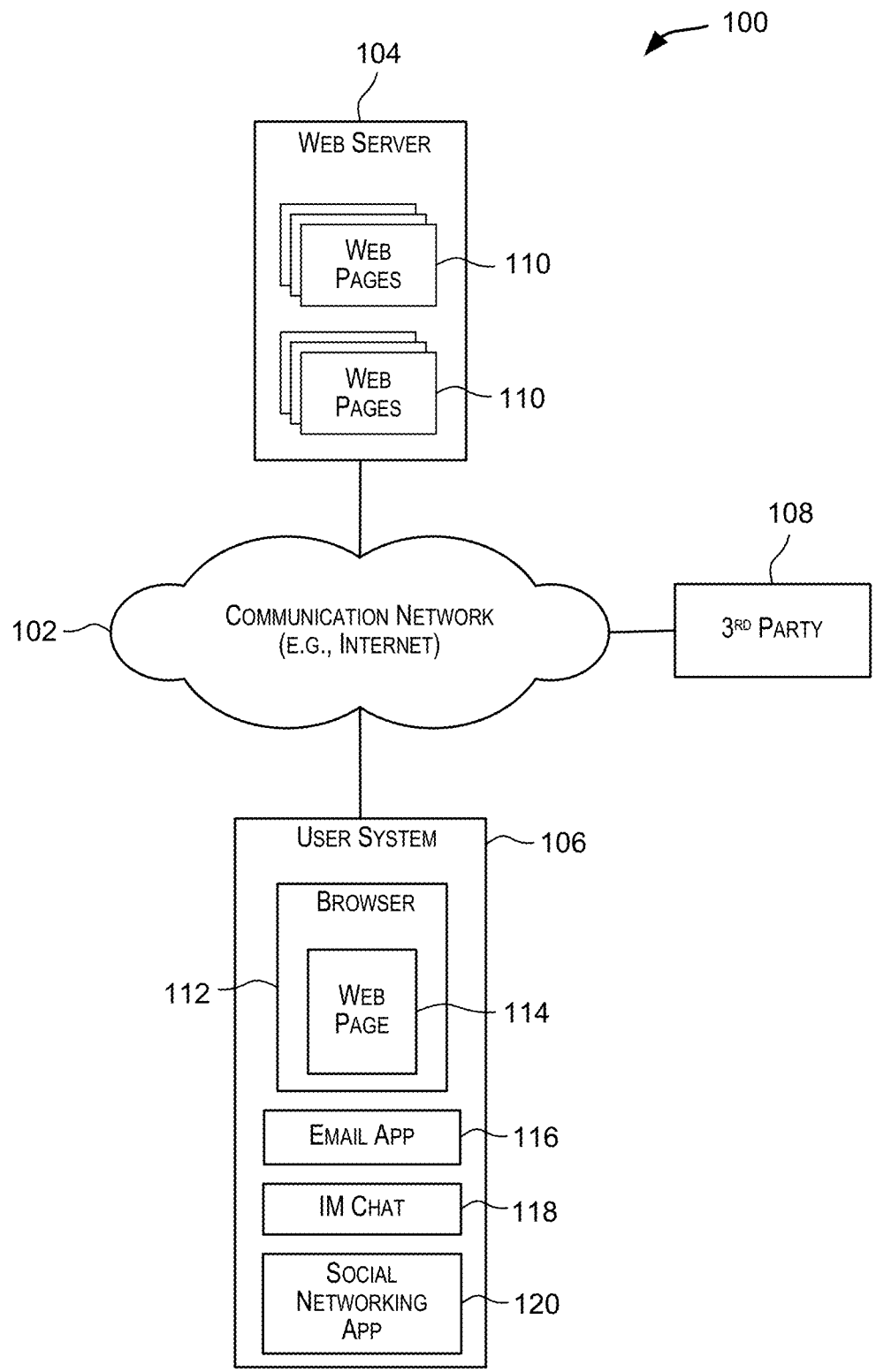
FIG. 1 is a simplified block diagram of a system incorporating an embodiment of the present invention.

FIG. 1 is a simplified block diagram of a system 100 incorporating an embodiment of the present invention. FIG. 1 is merely an example, which should not unduly limit the scope of the claims. One of ordinary skill in the art would recognize many variations, alternatives, and modifications.

As depicted in FIG. 1, system 100 comprises several computer systems communicatively coupled to each other via communication network 102. In one embodiment, communication network 102 is the Internet. In alternative embodiments, communication network 102 may be any type of network that enables communications between the various computer systems including but not restricted to an Intranet, a local area network (LAN), a wide area network (WAN), an Ethernet network, and the like, or combinations thereof. Different communication protocols, including wired and wireless protocols, may be used for data communications over network 102 including but not limited to TCP/IP, SNA, IPX, AppleTalk, IEEE 802.XX suite of protocols, the Bluetooth protocol, and/or other protocols or combination of protocols.

The computer systems depicted in FIG. 1 include a web server 104, a user system 106, and a 3$^{rd}$ party system 108.

While only one web server and user system are shown in FIG. 1, system 100 may include several users systems and web servers. Likewise, system 100 may include multiple 3$^{rd}$ party systems. Web server 104 is configured to host one or more websites 110, each website comprising one or more web pages. Users may access web pages provided by web server 104 using user system 106. For example, a user may use an application such as browser 112 executing on user system 106 to access one or more web pages stored by web server 104. Examples of commonly used browsers include Windows Internet Explorer, Mozilla Firefox, Apple Safari, Google Chrome, Opera, and others. A user may request a new web page by providing a uniform resource locator (URL) corresponding to the web page to the browser or by clicking on a link in a web page. The new web page 114 corresponding to the URL or the clicked link is then fetched and output or rendered to the user by the browser.

According to an embodiment of the present invention, contents of a web page accessed by a user, such as web 114, can be made sharable. Making content on a web page sharable enables that content to be shared with a target. In one embodiment, making content of a web page sharable comprises enabling drag and drop functionality for the sharable content. In one embodiment, sharing the content with the target enables the target to access, view, and/or interact with the shared content. This may be done by communicating the shared content to the target as a result of the sharing and/or by communicating information to the target that enables the target to access, view, and/or interact with the shared content.

In one embodiment, processing performed to make content on a web page sharable comprises identifying specific content on the web page that is to be made sharable and then making the identified specific content sharable. In one embodiment, this processing is performed by the user system upon loading of the web page whose content is to be made sharable. For example, when a web page is loaded, the web page is scanned to identify specific content that is to be made sharable and that identified content is then made sharable. Further details related to this processing are described below with reference to FIGS. 2 and 3. Examples of content of a web page that may be made sharable include but are not restricted to images or photos displayed by the web page, videos or movies displayed by the web pages, flash videos, music, games including flash games, paragraphs of a web page, tables on the web page, links on the web page, embedded objects (e.g., flash objects, maps, contact information, files, custom content) on the web page, text (including user-selected text), and the like.

In one embodiment, visual indications may be provided for content on a web page that is made sharable to enable a viewer of the web page to easily identify the sharable content. The visual indications may come in various forms including drawing a border around the sharable content, changing the style (e.g., color overlays, font size, bolding, text style, etc.) of displaying the sharable content, structural alterations to the sharable content (e.g., the overlay of a "Drag to Share" graphic over the sharable content). The visual indications may be shown in static form and/or in dynamic form. Dynamic visual indications are typically associated with cursor related events related to the sharable content. For example, a border around a sharable content may be drawn whenever there is as a mouseover event over the sharable content.

For content that had been made sharable, the user can then share content with one or more targets (also referred to as share targets). A share target may be another application such as a communication application (e.g., an email application, a chat application, an instance messaging (IM) application), a social network application (e.g., Facebook or Twitter which may execute in a separate tab of the browser), an editor application (e.g., MS WORD, image editing applications), a commerce application (e.g., a Shopping Cart, a Wish List), and the like. A share target may be a specific buddy or friend from a buddies or friends list in an IM chat, an email recipient, and the like. A share target may also include an active IM conversation represented by an IM window to a specific user. The targets may be represented in different forms including an icon, an image representing a target, a window, etc. A target application may be running in many forms (e.g., locally on the user system, online on the user system's web browser, remotely on another user's system, remotely on a server, remotely on a mobile device).

As indicated above, in one embodiment, making content sharable comprises enabling drag and drop capability on the content. In such an embodiment, sharable content may be shared with a shared target using a drag and drop operation. For example, a user viewing a web page comprising sharable content may select the sharable content using an input device such as a mouse, drag the selected content to a share target, and then drop the dragged content on the share target. The action of dropping the selected content on the share target initiates the sharing process for the content to be shared with the share target.

The effect of sharing web page content with a share target enables the share target to access, view, and/or interact with the shared content. The actions that are performed upon sharing content with a target may depend upon the nature and context of the share target. As an example, suppose that a user viewing a web page via browser 112 wants to share sharable content (e.g., an image or video displayed on the web page) with a specific buddy from a list of buddies in an IM chat 118 executing on user system 106. The user may drag the sharable content from the web page and drop it onto a window or other element of IM chat window 118 representing the specific buddy. This causes a message to be sent to the specific buddy comprising the sharable content or comprising information that enables the buddy to access, view, and/or interact with the sharable content. In this manner, the sharable content is shared with the IM buddy. As another example, the user may drag and drop the sharable content from the web page onto a communication application such as email application 116 executing on user system 106. In this instance, dropping the sharable content on email application 116 may cause a new email message to be opened with the sharable content included or attached to the email message. As another example, if the sharable content was dropped onto a particular email or on a particular contact, then a message may be sent to the particular email sender or to the particular contact comprising the shared content or comprising information that enables the particular sender or particular contact to access, view, and/or interact with the sharable content. As yet another example, suppose that the user wants to share the sharable content with a friend in his social network such as in Facebook or Twitter. The user may drag the sharable content from the web page and drop it onto a representation of the friend in a Facebook or Twitter window 120. This causes a message to be sent to the friend comprising the sharable content or information that enables the friend to access, view, and/or interact with the shared content. As another example, if the sharable content is dragged and dropped into an editor (e.g., a text editor, image editor, video editor), the editor may be opened and the shared content made usable via the editor. As yet another example, the target may be a shopping cart. The user may drag an image on a web page and drag the image to the shopping cart. The image may represent an item to be purchased (e.g., shoes, a book) and dropping the image on the shopping cart enables the shopping cart to add the items represented by the image to a shopping list for the user.

Figure 2:
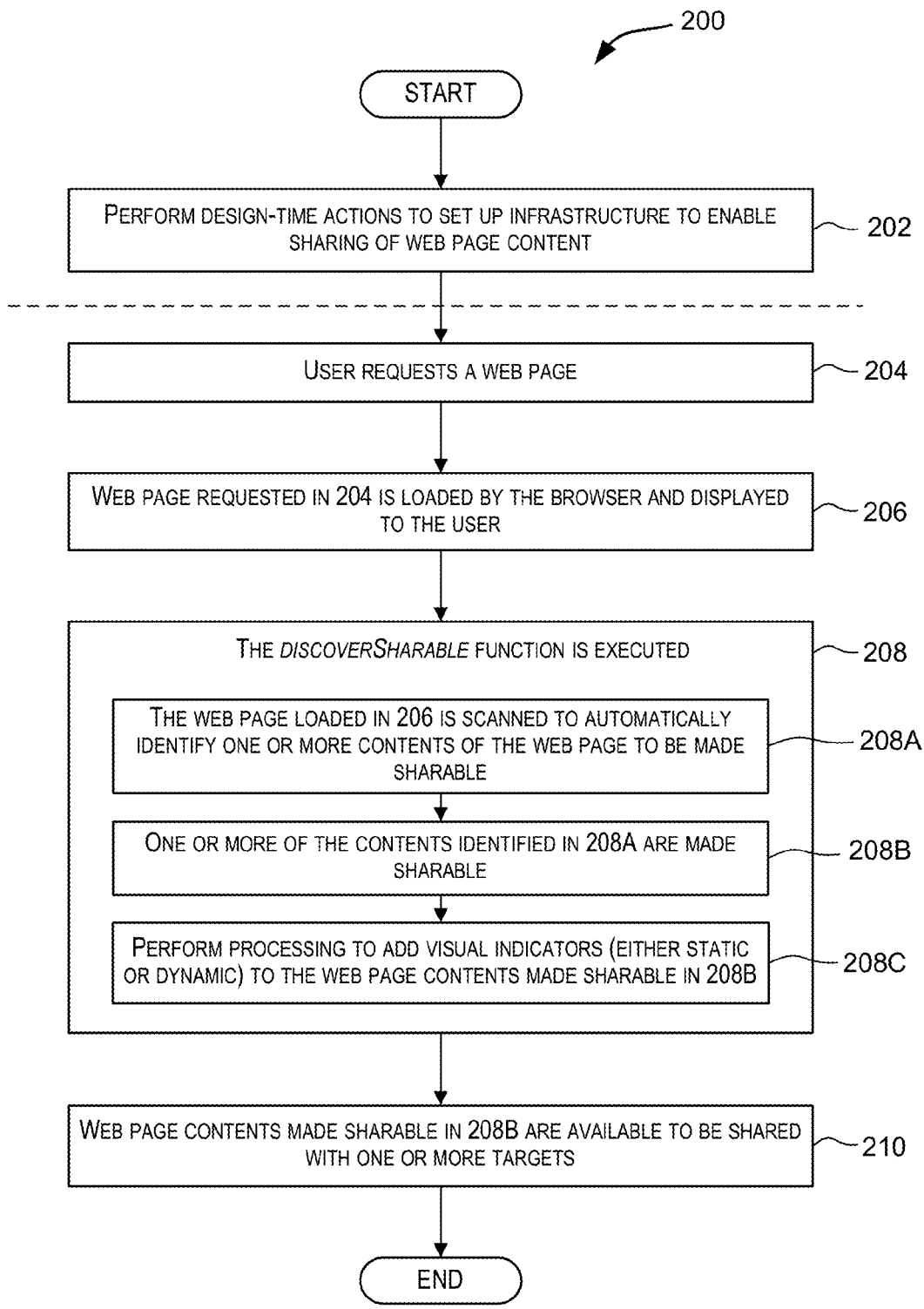
FIG. 2 is a simplified flowchart depicting a high level method for making content on a web page sharable according to an embodiment of the present application.

FIG. 2 is a simplified flowchart 200 depicting a high level method for making content on a web page sharable according to an embodiment of the present application. The method depicted in FIG. 2 may be performed by software (e.g., program, code, instructions executed by a processor), in hardware, or combinations thereof. The software may be stored on a computer-readable storage medium.

At a high level, the method for making content on a web page sharable can be divided into steps that are performed at design time and steps that are performed at run time when a user accesses a web page. As depicted in FIG. 2, at design time actions may be performed that set up the infrastructure to enable sharing of content of web page content (step 202). In one embodiment, as part of the design time actions, the provider of a web page associates code or instructions with a web page whose one or more contents are to be made sharable. The code is associated with the web page such that the code is executed at the user system when the web page is accessed by a user. When the code is executed at run time, the contents of the web page that are to be made sharable are identified and made sharable.

In one embodiment, the code that is associated with the web page to make the page's contents sharable may be provided by the web page provider. In an alternative embodiment, the code may be provided by a $3^{rd}$ party such as Meebo, Inc. of Mountain View, Calif. In the alternative embodiment, the code may be stored on a system 108 (in FIG. 1) of the $3^{rd}$ party and exposed to web page providers via a set of application programming interfaces (APIs). A web page provider may include such an API call in the web page code such that the function referenced by the API is called and executed when that web page is loaded by the browser on a user system and execution of the function causes one or more contents of the web page to be identified and made sharable. In one embodiment, the code corresponding to the API is executed by the browser on the user system. The code may be in various different languages. In one embodiment, the code is in a scripting language such as JavaScript. The APIs may also include APIs for customizing and controlling the process of making content on a web page sharable.

For example, in one embodiment, the provider may include the following JavaScript b function call in the Hyper Text Markup Language (HTML) code for the web page whose contents are to be made sharable:

Meebo.exec ('discoverSharable');

The source for the function call may be may be stored on $3^{rd}$ party system 108. Information may be included in the web page code by the web page provider indicating that the source for the function call is the $3^{rd}$ party system (e.g., Meebo). As a result of including the function call in the source code (e.g., HTML code) of the web page, the function is executed by browser 112 on user system 106 when the web page is loaded by the browser. In one embodiment, upon execution, the function is configured to automatically scan the web page contents and identify one or more contents that are to be made sharable. The function is then configured to make the identified contents sharable. Further details related to the execution of the discoverSharable function, including how contents that are to be made sharable are identified and how the contents are made sharable, are described below with respect to FIG. 3.

The discoverSharable function provides a simple and convenient way for a web page provider to enable web page content sharing on web pages (on entire web sites) provided by the provider. The discoverSharable function may be included with every web page associated with a web site or only a select set of web pages. A web page provider may deliberately not want to make contents of some web pages sharable and thus could exclude those web pages from executing the discoverSharable function in their code. The web page provider has complete control over which web pages execute the discoverSharable function. The web page provider thus has complete control over which web pages contain sharable content.

In one embodiment, the types of content that are made sharable by execution of the discoverSharable function can also be configured/customized. For example, a particular web page provider may only want to make images and videos contained by a web page to be made sharable. In such a scenario, the discoverSharable function may be configured such that only images and videos, if any, contained by a web page are identified and made sharable. The other content that a web page may contain is not made sharable. In this manner, the type of content that is made sharable can be controlled. In another embodiment, APIs may also be provided that enable a web page to specifically mark content to be made sharable or alternatively to specifically mark content that is not to be made sharable optionally taking precedence over the configuration that specifies which content types are to be made sharable.

In the embodiment described above, the web page provider has to take actions to associate specific code that enables sharing with a web page. In an alternative embodiment, the ability to make web page content sharable may be provided directly to the user, without involving the web page provider. In this alternative embodiment, the user may download code that enables content to be made sharable and associate the code with a browser executing on the user system. For example, the user may download the code from $3^{rd}$ party system 108 and associate the code with the browser as a plug-in. In this embodiment, the code may be configured to execute whenever a new web page is loaded by the plug-in-enabled browser. In another embodiment, a user can execute the code from the $3^{rd}$ party system 108 by activating a bookmarklet, which in many browser systems consists of JavaScript code embedded in a bookmark. Activating the bookmarklet executes the JavaScript code on the page, causing the identification of sharable content. In these alternative embodiments, the web page provider does not have to do anything to enable web page content sharing. This also implies, however, that the web page provider cannot control which pages are enabled for content sharing.

Once design-time actions have been performed to enable web page content to be made sharable, the actual processing to identify the content and make it sharable is performed during runtime. During runtime processing, a user may request a particular web page using an application such as a browser executing on a user system (step 204). The web page may be requested for example by the user providing the URL for the web page to the browser. Alternatively, the web page may be requested as a result of the user clicking on a link on another web page already loaded by the browser. The web page requested by the user is then loaded by the browser and displayed to the user (step 206).

If the discoverSharable function is included in the source code for the accessed web page (or the browser is enabled with a plug-in configured to make web page content sharable), the discoverSharable function is executed upon loading the web page (step 208). As part of 208, the web page is scanned to automatically identify contents of the web page that are to be made sharable (step 208A). One or more of the contents identified in 208A are then made sharable (step 208B). Processing may be performed to add visual indicators (either static or dynamic) to the web page contents made sharable in 208B to enable a user to easily determine which web page content is sharable (step 208C). The contents made sharable in 208B are then available to be shared with one or more share targets (step 210).

As described above, the discoverSharable function (or any such code) associated with a web page is executed when that web page is loaded by a browser. This may be sufficient for a static web page wherein the content of the web page does not change after the web page has been loaded. However, many web pages are capable of dynamically loading content without requiring the entire web page to be reloaded. As a result, the contents of such a web page may change subsequent to the initial load of the page with new or changed content being added to the web page dynamically. In such a scenario, the discoverSharable function (or any such code) may be called multiple times (e.g., each time that new content is loaded onto the web page, each time the web page modifies its current content). In this manner, the new or changed content can also be discovered and made sharable. The web page provider can control when the discoverSharable function is to be executed since the provider knows when the web page content changes. In one embodiment, the discoverSharable may be automatically called periodically. For example, the frequency of execution of the function can be time based, for example, the function may be configured to execute every 5 minutes. In this manner, content on dynamic web pages may also be identified and made sharable.

Structurally, a web page comprises one or more elements that represent the contents of the web page. Examples of elements contained by a web page include but are not restricted to an image, a sound, a video, a table, a heading, a paragraph, a division, an embedded element, and the like. An element of a web page can contain other elements. For a web page constructed using a markup language such as HTML or dynamic-HTML, each element contained by the web page is identified in the source code for the web page using one or more HTML tags. For example, an image element is contained within an <img . . . /> tag, a sound element may be contained within an <audio . . . /> tag, a video element may be contained within a <video . . . /> tag, a table is contained within <table> and </table> tags, a paragraph is contained within <p> and </p> tags, a division element is contained within <d> and </d> tags, embedded content including plug-ins, audio, and video content may be contained within <object . . . /> or <embed . . . /> tags, and so on. In this manner, specific contents or elements of a web page can be identified based upon the corresponding tags contained in the source code of the web page. These tags are accordingly used by an embodiment of the present invention to identify specific content of the web page that is to be made sharable.

Figure 3:
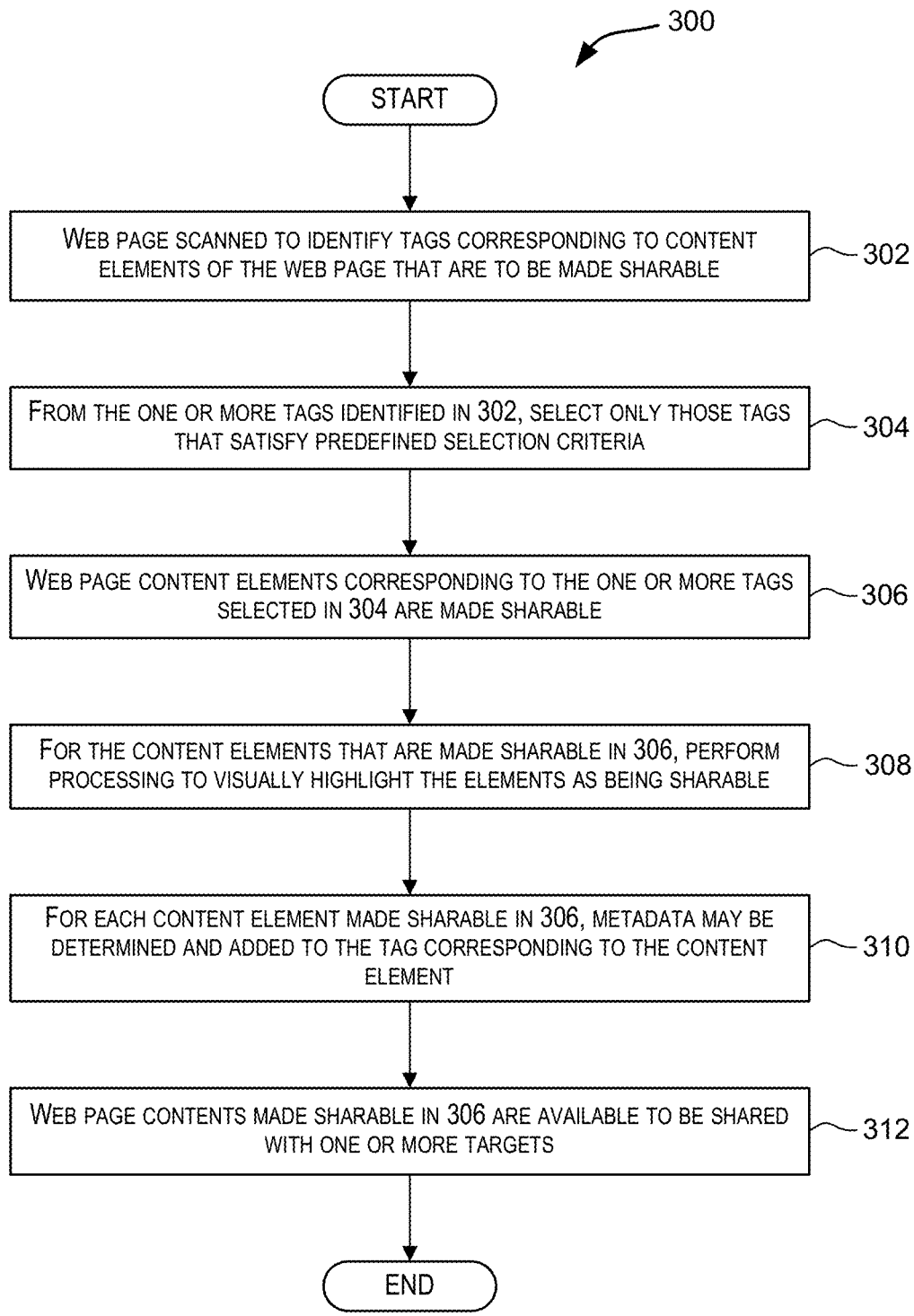
FIG. 3 is a simplified flowchart depicting high level processing performed at a user system as a result of execution of code (e.g., the discoverSharable function) for making web page content sharable according to an embodiment of the present invention.

FIG. 3 is a simplified flowchart 300 depicting high level processing performed at a user system as a result of execution of code (e.g., the discoverSharable function) for making web page content sharable according to an embodiment of the present invention. The method depicted in FIG. 3 may be performed by software (e.g., program, code, instructions executed by a processor), in hardware, or combinations thereof. The software may be stored on a computer-readable storage medium.

Upon execution of the discoverSharable function, the source code (e.g., HTML code) of the web page is scanned to identify tags corresponding to content elements of the web page that are to be made sharable (step 302). For example, if images and video content are to be made sharable, then in 302 the web page is scanned for tags that contain image and video content. For example, the web page may be scanned for <img> tags corresponding to images. For video content, the web page may be scanned for <embed> tags, or <video> tags, or other tags that contain video content.

In one embodiment, as part of the scan performed in 302, other information related to the identified tags may also be determined. For example, for an <img> tag, the source of the image may be scanned for within the body of the <img> tag attributes. Likewise, for an <embed> tag, the source of the embedded content may be scanned for within the attributes of the <embed> tag. Further, for some tags, a check is made for parent tags (tags which contain the tag being examined) to find relevant information. For example, an <a> tag associated with the <img> tag might provide a relevant location for the sharable item. In this example, as described below, the scan determines the information to be communicated to a target when the image corresponding to the <img> tag is shared with the target. In one embodiment, if there is no <a> tag associated with the <img> tag, then the URL of the current web page containing the <img> tag is sent to the target, else the URL referenced by the href attribute of the <a> tag is sent to the target. This could occur when a user is sharing a photo from a gallery of photos intending to share a photo with a target rather than the entire gallery.

As indicated above, a web page provider may specifically mark a content element to be made sharable or alternatively specifically mark a content element to be not made sharable. These markings are also checked for as part of the processing performed in 302. If a tag corresponding to a content element is marked to be made sharable, then that tag is included in tags to be made sharable. If a tag is marked for non-sharing, then that tag is excluded from the tags identified in 302 even though the tag would otherwise have been selected for inclusion.

In one embodiment, the web page content elements corresponding to the tags identified in 302 are made sharable. In another embodiment, the elements corresponding to the one or more tags identified in 302 are candidates for being made sharable. The candidates identified in 302 are passed through a filtering step to determine one or more of the candidates that should be made sharable. The filtering step is used to narrow down the elements that are made sharable. For example, a web page may contain several small images including images that are artwork or part of the user interface of the web page. These small images are typically not the ones that a user shares with targets. These small irrelevant images would be identified in 302 but should preferably be filtered out in the filtering step.

Accordingly, from the one or more tags identified in 302, only those tags that satisfy predefined selection criteria are selected to be made sharable (step 304). In one embodiment, whether or not a tag satisfies the selection criteria is determined based upon one or more attributes associated with the tag. For example, whether an <img> tag corresponding to an image element satisfies the selection criteria defined for <img> tags is determined based upon the attributes of that <img> tag. Different selection criteria may be configured for the different types of tag. For example, the selection criteria specified for an <img> tag may be different from the selection criteria specified for an <embed> tag.

In one embodiment, the selection criteria for an <img> tag specifies that the <img> tag is to be selected to be made sharable only if the associated height attribute value (measured in pixels) is at least 70 and the associated width attribute value (measured in pixels) is at least 70. Per such selection criteria, an image element of a web page is selected to be made sharable only if the image is at least 70×70 pixels in dimension. Accordingly, an <img> tag identified in 302 is selected in 304 to be made sharable only if the associated height attribute value is at least 70 pixels and the associated width attribute value is at least 70 pixels. This filters out images that may have been identified in 302 but are smaller than 70×70 pixels.

In one embodiment, the selection criteria for an <embed> tag specifies that the <embed> tag is to be selected to be made sharable only if the associated height attribute value (measured in pixels) is at least 300 and the associated width attribute value (measured in pixels) is at least 250. Per such selection criteria, an embedded video element of a web page is selected to be made sharable only if the video element is at least 300×250 pixels in dimension. Accordingly, an <embed> tag identified in 302 is selected in 304 to be made sharable only if the associated height attribute value is at least 300 pixels and the associated width attribute value is at least 250 pixels. This filters out videos that may have been identified in 302 but are smaller than 300×250 pixels.

Other heuristics may also be used to specify the selection criteria for a tag type. These heuristics may include, for example, the content file size, content element location in the web page structure, content source location, or other content-related attribute or metadata.

The web page contents corresponding to the one or more tags selected in 304 are then made sharable (step 306). A content element is made sharable by associating actions with the content element that enable the content element to be shared with a target. In one embodiment, a content element is made sharable by associating actions with the element that enable drag and drop capability for that element. Actions may be associated with the content element in the form of one or more event handlers that are associated with the content element and that enable drag and drop functionality for the content element. An event handler specifies one or more actions to be performed upon occurrence of an event. According to an embodiment of the present invention, one or more event handlers may be associated with a sharable content element that specify one or more actions to be performed when an event related to the sharable content element occurs, such as when the sharable content element is selected, dragged, and/or dropped onto a target.

For example, for an image corresponding to an <img> tag that is to be made sharable, event handlers are added to the <img> tag to enable drag and drop capability. These might include an event handler for a mouse-related event such as an onMouseOver event so that when a user moves his or her mouse over the image, a visual indicator (e.g., borders, drop shadows, animated tooltips over or above the image reading "Drag to Share") will prompt the user to share. Other event handlers responding to onMouseDown and onMouseMove events may detect if the user is starting to drag the sharable content element. Once the user starts dragging the mouse, a share interface appears and indicates the share targets as locations where the sharable item being dragged may be dropped.

For the content elements that are made sharable in 306, processing may be performed to visually highlight the elements as being sharable (step 308). The visual indications may come in various forms including drawing a border around the sharable content, changing the style (e.g., color overlays, font size, bolding, text style, etc.) of displaying the sharable content, and structural alterations to the sharable content. The visual indications may be shown in static form or in dynamic form. Dynamic visual indications are typically associated with cursor related events related to the sharable content. For example, a border around a sharable content may be drawn whenever there is as a mouseover event over the sharable content. A mouseover event occurs when a mouse cursor enters over the sharable content displayed on the web page. Dynamic visual indications may also include changing the appearance of the cursor (e.g., a mouse cursor) when there is a mouseover event on a sharable element, providing a tooltip when the user hovers the cursor over a sharable element without clicking it, etc. A tooltip is a graphical user interface element that displays a small hover box that appears with supplementary information regarding the item being hovered over. The supplemental information may indicate that the hovered over item is a sharable web page element.

In one embodiment, visual indications are added to a web page element by adding styles and/or actions (e.g., using event handlers) to the tag corresponding to the sharable element. For example, an event handler may be added that causes a border to be drawn around the sharable content element, a tooltip to appear, etc. when the mouse cursor is moved over or hovers over the sharable content element on the web page. In one embodiment, default styles may be defined. For example, by default a shadow around a sharable content element may be created on a mouseover over the sharable element. The default behavior may be changed. For example, APIs may also be provided that enable a web page provider to change or customize the default styles.

In one embodiment, a setSharableStyle function is provided that enables the default behavior to be changed or customized. In one embodiment, the setSharableStyle function call takes the following parameters:

borderColor—Hex color code, makes the border outline solid rather than a shadow borderWidth—Width of the border, defaults to 12 pixels imageTooltipPosition—Defaults to center, could be set to one of none, top, center, bottom videoTooltipPosition—Defaults to left, could be set to one of left, center, right For example, if the web page background is black (or dark), the default shadow that is created upon a mouseover may not be visible. In such a scenario, the web page provider may change the shadow to a red or green border to make it more easily visible using the setSharableStyle function.

For each content element made sharable in 306, metadata may be determined and added to the tag corresponding to the content element (step 310). In one embodiment, the metadata determined and added to a tag corresponding to a sharable content element comprises information to be communicated to a target with which the content element is shared. Further details related to the metadata are provided below. The content elements made sharable in 306 are then available for sharing (step 312).

In the manner described above, contents (also referred to as content elements) of a web page are dynamically determined and made sharable. While FIG. 3 and the associated description describes how to identify and make image and video content elements sharable, this is however not intended to limit the scope of the present invention. In alternative embodiments, other content elements of a web page may also be made sharable.

After a content element of a web page has been made sharable that element can be directly shared with a target. Sharing a content element with a target enables that target to access, view, and/or interact with the content element being shared. In one embodiment, when a content element is shared with a target, the following items are provided to the target as a result of the sharing (e.g., as a result of the drag and drop operation):

(1) A URL—pointing to a location where the shared element is stored. The URL defines where the target is directed to when the shared content element is clicked upon. If the shared element is an image wrapped in the href attribute of an <a> tag, then the URL defaults to the href url, else the URL of the web page itself is provided.

(2) A thumbnail representation (optional)—of the shared content element. This defaults to the thumbnail provided by the element.src attribute of the tag corresponding to the sharable element in the source code for the web page. If element does not have an src, then a default generic icon may be used as the thumbnail for representing the shared element. In one embodiment, when a user selects and drags a content element, the thumbnail corresponding to the selected content is visually shown as being dragged. The dragged thumbnail can then be dropped onto a target to share the content with the target.

(3) Title (optional)—for the shared content element. This defaults to element.title (title specified for the web page) or to window.title (browser window title) if there is no title specified for the web page.

(4) Description (optional)—for the shared content element. This defaults to element.alt, or to a generic string if the element has no alt.

(5) Type (optional)—of the shared content element. In an embodiment where images and video are made sharable, this defaults to video for <embed> elements and to image for <img> elements.

In one embodiment, as part of execution of the discoverSharable function, metadata is determined and associated with a sharable content element comprising information related to the URL, thumbnail, title, description, and type for the content element. In one embodiment, this may be done as follows:

```
<html xmlns:meebo=http://www.meebo.com/communityim>
<img src=http://example.com/image.jpg
    meebo:thumbnail=http://example.com/thumb1.jpg
    meebo:url=http://example.com/index.html
    meebo:title="Cool picture" />
...
<script type="text/javascript">
// This will interpolate the thumbnail, url, and title form the attributes in
HTML Meebo.exec('discoverSharable');
</script>
```

Video content typically do not have thumbnails. In one embodiment, as part of the processing to identify a thumbnail to be used for shared video, an attempt is made to find a thumbnail by querying the service provider providing the video on the web page. Many service providers such as YouTube provide APIs that can be used to query information about a video, such as title of video, whether there is a thumbnail for the video, etc. These APIs may be used to find metadata information for video content, including determining a thumbnail for the video. If the service provider cannot provide any information for the video, then a generic default thumbnail may be used.

In one embodiment, metadata may be determined, created, and attached to sharable content during execution of the discoverSharable process. Accordingly, in this embodiment, the metadata is determined ahead of when the sharable content is actually shared with a target. In another embodiment, the metadata may be determined, created, and attached to sharable content when the user starts sharing that content.

Figure 4:
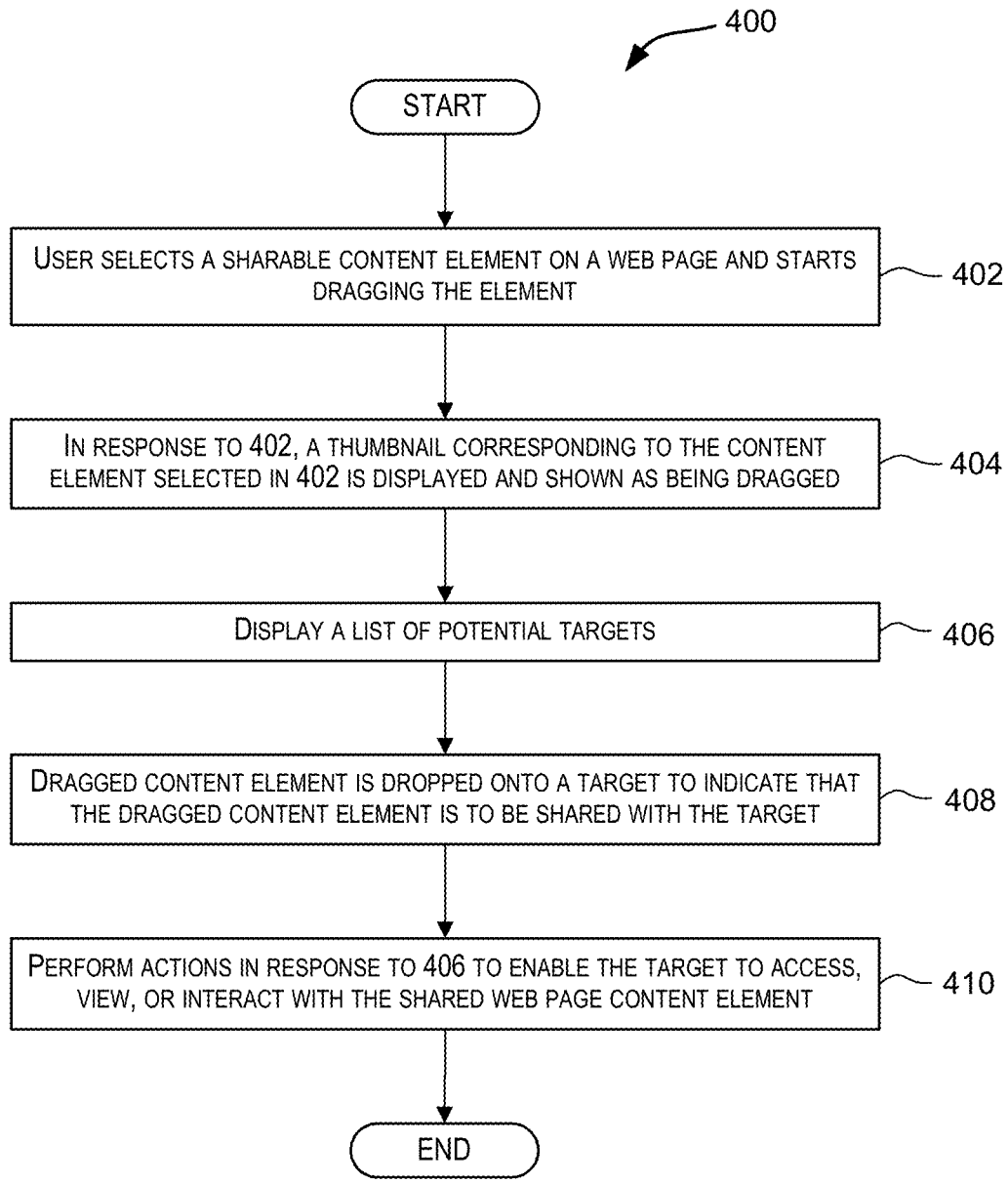
FIG. 4 is a simplified flowchart depicting high level processing performed when a user drags and drops a sharable web page content element onto a target according to an embodiment of the present invention.

FIG. 4 is a simplified flowchart 400 depicting high level processing performed when a user drags and drops a sharable web page content element onto a target according to an embodiment of the present invention. The method depicted in FIG. 4 may be performed by software (e.g., program, code, instructions executed by a processor), in hardware, or combinations thereof. The software may be stored on a computer-readable storage medium.

Processing may be initiated when a user selects a sharable content element and starts dragging the content element (step 402). For example, the user may use a mouse to select a sharable content element and start dragging the element. In response to the selection and dragging, a thumbnail corresponding to the selected content element is displayed and shown as being dragged (step 404). Optionally, as the user drags the element, a list of potential drop targets may be indicated (step 406). In one embodiment, icons representing potential drop targets may be displayed proximal to the dragged element. In another embodiment, potential drop targets may be visually highlighted (e.g., shadows or borders drawn around the potential target icons/windows). In another embodiment, dragging a sharable element may cause a closed buddy list (e.g., from an IM application) to open showing buddies which may be potential drop targets. In yet another embodiment, minimized dialogs or windows for potential target applications may open in response to the dragging. In another embodiment, non-visible targets may be made visible in response to the dragging.

The dragged content element may then be dropped onto a target (step 408) to indicate that the dragged content element is to be shared with the target. Examples of targets include one or more friends or buddies in a chat client or social networking application, dialogs or windows of a chat client, friend presence elements in a web page, other elements of the chat client or web page (possibly associated with a particular friend/buddy or friends/buddies), any application, a shopping cart, and the like. In general, any entity with which a user viewing a web page would like to share information may be a target.

Various actions may be performed upon dropping the dragged element onto a target that enable the target to access, view, and/or interact with the shared content (step 410). As previously described, the actions that are performed may depend upon the context of the target. For example, if the sharable content is dropped onto a friend in an IM chat client, a message is sent to the friend including a URL (and possibly additional metadata such as a title or thumbnail) that the friend can use to access, view, and/or interact with the sharable content. The friend can then click on the URL link sent in the message to access, view, and/or interact with the shared content. In one embodiment, clicking the URL link directs the friend to a web page from where the content can be accessed, viewed, and/or interacted with.

In general, actions are performed in 410 that enable the target to access, view, and/or interact with the shared content element. In one embodiment, the shared content itself may be included in the message sent to the target. In another embodiment, rather than sending the shared content, instead information (e.g., a URL) that enables the target to access, view, and/or interact with the shared content may be sent. Sending a URL link instead of the shared content itself reduces the amount of data that is provided to the target. This is especially helpful when the shared content is very large in size and cannot be sent via a message to the target. Further, in one embodiment, clicking the URL link may redirect the target user to a web page from the web site of the web page provider that provides access to the shared content. This may be desired by the web page provider since it directs users to the provider's web site.

In some embodiments, as part of 410, the target with which the content is shared may also be visually highlighted. For example, a border may be drawn around the target. In some embodiments, a log may be stored on the user's system identifying targets and content that has been shared with each target. This provides the user with historical information regarding the user's sharing activities so that the user can easily access a list of recently shared content later.

As described above, embodiments of the present invention enable web page content to be directly shared with one or more targets. For example, a user may share web page content directly from a browser to an IM client target. The intermediate step of downloading and saving the content to the client/desktop is not required. Embodiments of the present invention make sharing of web page content easy both from the perspective of the web page provider and the end user. The web page provider can associate code with a web page whose contents are to be made sharable. In some embodiments the code itself may be provided by a $3^{rd}$ party and the web page provider simply has to include an API function call to the code in the web page's code. From the user's perspective, being able to directly share web page content with a target, for example by using drag and drop operations, reduces the time and effort needed for the content sharing.

Various functions and APIs may be provided for customizing the manner in which content to be made sharable on a web page is identified and made sharable. For example, as described above with respect to step 304 in FIG. 3, selection criteria is used to select which tags will be made sharable. In one embodiment, default selection criteria may be configured for the various types of tags (or types of content) to be made sharable. For most web page providers, the default selection criteria may be sufficient. However, some web page providers may want to change and customize the default criteria to have more control over which content become sharable. For such customization, in one embodiment, the discoverSharable function can be called with parameters that override the default parameters. For example, the following function call may be made:

```
Meebo.exec('discoverSharable', {
    minImageWidth : 200,
    minImageHeight : 200,
    minVideoWidth : 400,
    minvideoHeight : 300,
    }
);
```

The minImageWidth parameter specifies the new minimum width for an <img> tag to be made sharable. The default value is 70.
The minImageHeight parameter specifies the new minimum height for an <img> tag to be made sharable. The default value is 70.
The minVideoWidth parameter specifies the new minimum width for an <embed> tag to be made sharable. The default value is 300.
The minVideoHeigth parameter specifies the new minimum height for an <embed> tag to be made sharable. The default value is 250.

As described above, the discoverSharable function automatically scans a web page to identify content elements of the web page that are to be made sharable and makes the identified content elements sharable. The discoverSharable function can be configured to make specific content elements (e.g., only images and video content) sharable. A web page provider may however want more control on what content is made sharable. Further, there may be times when a content element is not selected for sharing, possibly because the element does not satisfy the selection criteria, but is to be made sharable. Alternatively, in some situations, a web page provider may not want to use the discoverSharable function and instead want to "manually" identify content elements to be made sharable. For such instances, in one embodiment, a makeSharable function is provided that enables specific content elements to be marked for sharing. The web page provider may include a function call in the source code for the web page to the makeSharable function. The code for the function may be resident on the system of a 3$^{rd}$ party such as Meebo, Inc. In one embodiment, the function is called as follows:

Meebo.exec('makeSharable', element_ID)

The element_ID identifies the content element that is to be made sharable. For example, the following function call makes the content element with ID 'cool-image' sharable.

Meebo.exec('makesharable', 'cool-image');

Alternatively, an image to be shared may be created dynamically and made sharable as follows:

```
var img = document.createElement('img');
img.src = "http://www.example.com/cool/image.jpg"
document.body.appendChild(img);
Meebo.exec('makeSharable', img);
```

In one embodiment, metadata for a content element that is made sharable may also be specified using the makeSharable function. This enables a web page provider to provide specific URL, thumbnail, description, etc. for a sharable content. This may be done using inline attributes. For example, for an element with id 'cool-image' that is to be made sharable, metadata may be defined for the element as follows:

```
Meebo.exec ('makeSharable', 'cool-image', {
    title: "Cool picture site",
    description: "A site with a really cool picture - worth checking out!"
});
```

In the above example, clicking the shared element will bring the user to a page that displays the title and description as provided in the metadata.

Another example:

```
Meebo.exec ('makeSharable', 'awesome-video', {
    title: "Awesome video",
    url: "http://example.com/video/,
    thumbnail: "http://example.com/video/thumb.jpg"
});
```

In the above example, clicking the shared item with id awesome-video will direct the user to example.com/video.

In one embodiment, content elements may also be specifically prevented from being made sharable. This may be done by setting a "notsharable" attribute of the tag corresponding to the content element to "true". Since elements can contain other elements. When a notsharable attribute is set for a tag, all tags contained by that tag are also made non-sharable. For example, if an image corresponding to the <img> tag identified in step 302 of FIG. 3 is to be made not sharable, the following code may be associated with the tag:

```
<div meebo: notsharable = "true" ... >
    <img src= ...>
    <embed src= ...> ... </embed>
</div>
```

As part of step 302, when the web page is being scanned to identify tags corresponding to content elements to be made sharable, any tag whose notsharable attribute is set to "true" along with any tags contained within that tag are not selected for sharing by the discoverSharable function. Typically, advertisements on a web page are made non-sharable using this technique.

In one embodiment, a specific type of content element may be treated as another type of content element. For example, the <embed> tag may comprise flash video. Normally, this would be treated as video content, as described above. In some instances it may be preferable to treat the flash video (Flash file (SWF)) as an image instead. For example, this may be done when the Flash is being used to display an animated image rather than a video. This may be done by setting the "type" attribute for the embed tag, as follows:

<embed meebo:type='image' ... > ... </embed>

This will cause the video to be treated as type image. A thumbnail may be specified for the image or a generic image icon may be used.

Figure 5A:
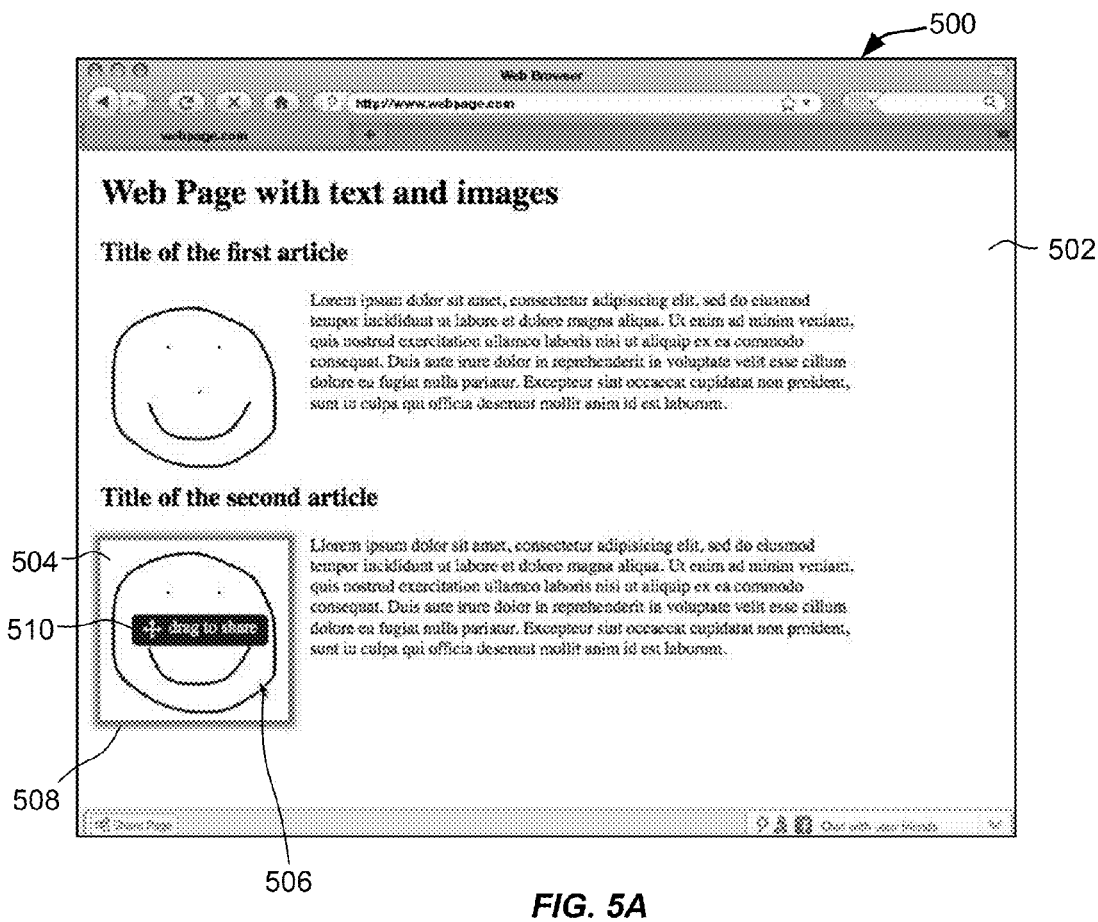
FIG. 5A depicts an example of how sharable content may be visually highlighted according to an embodiment of the present invention.

FIG. 5A depicts an example of how sharable content may be visually highlighted according to an embodiment of the present invention. As depicted in FIG. 5A, a web page 502 is displayed in a browser window 500. Web page 502 comprises various types of content including text and images. Web page 502 comprises content 504 that has been made sharable according to teachings of the present invention. In FIG. 5A sharable content 504 is an image. Sharable content 504 may be visually highlighted to enable a viewer of web page 502 to easily identify the sharable content. In the embodiment depicted in FIG. 5A, sharable content 504 is dynamically visually highlighted whenever a mouse cursor 506 hovers on the content. In FIG. 5A, sharable content 504 is visually highlighted by drawing a shadow border 508 around the content and by displaying a tool tip 510. Tool tip 510 comprises a message "drag to share" indicating that the content can be dragged and shared.

Figure 5B:
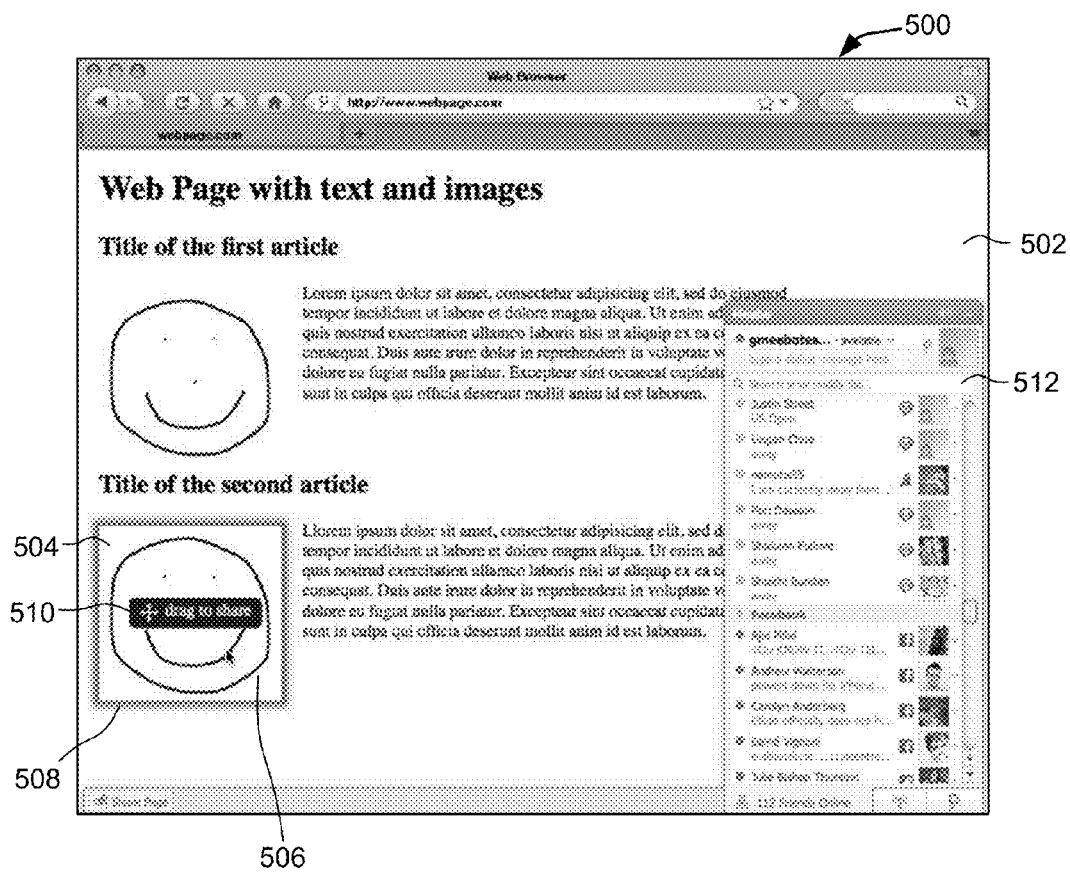
FIG. 5B depicts another example of how sharable content may be visually highlighted according to an embodiment of the present invention.

FIG. 5B depicts another example of how sharable content may be visually highlighted according to an embodiment of the present invention. In FIG. 5B, sharable content 504 is visually highlighted using a shadow border 508 and a tool tip 510 as described above for FIG. 5A. Additionally, when a user hovers over sharable content 504 and the user is also logged into an IM chat, the hovering action causes an IM window 512 to be displayed. IM window 512 may display a list of the user's buddies, which are potential targets for sharing the sharable content.

Figure 5C:
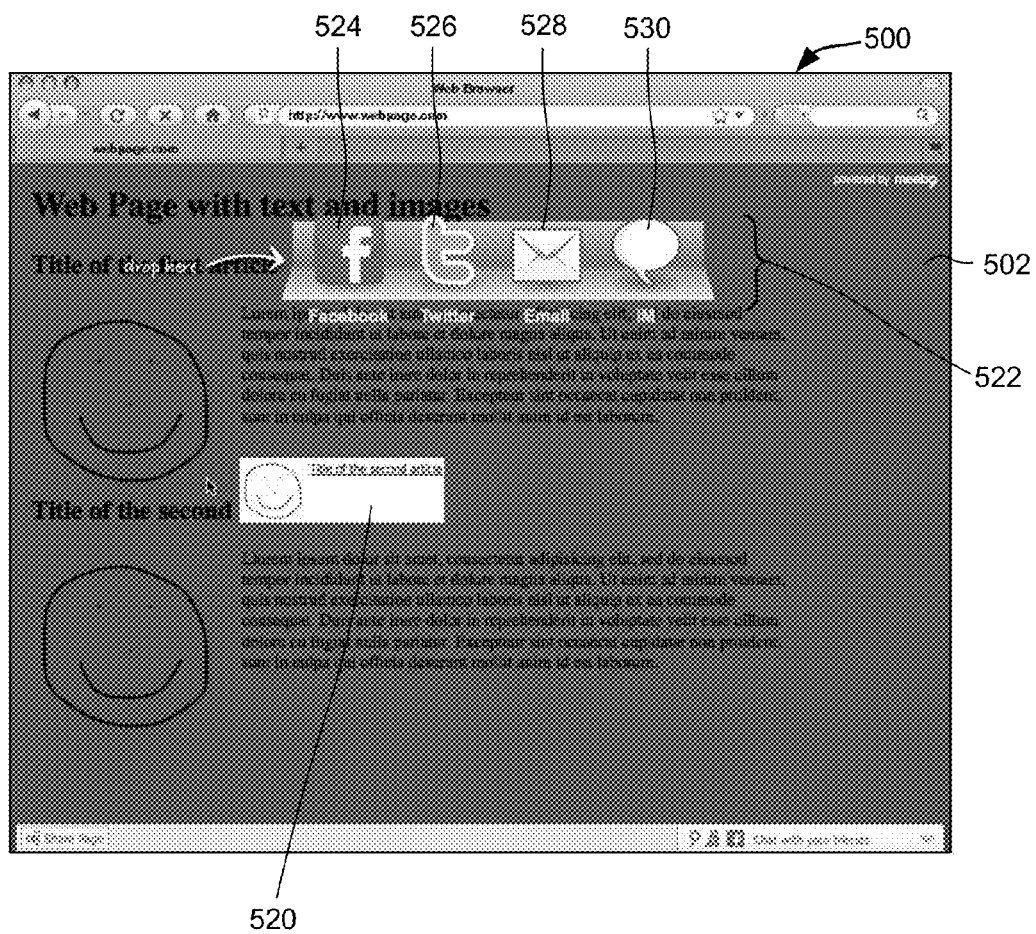
FIG. 5C depicts effects of selecting and dragging sharable content from a web page according to an embodiment of the present invention.

FIG. 5C depicts effects of selecting and dragging sharable content from a web page according to an embodiment of the present invention. As shown in FIG. 5C, selecting and dragging sharable content 504 causes a thumbnail 520 to be displayed. Thumbnail 520 represents the sharable content and can be dragged. Thumbnail 520 displays information related to sharable content 504. For example, in the embodiment depicted in FIG. 5C, thumbnail 520 comprises a miniaturized image of image 504 and a title "Title of the second article" of the article related to sharable content 504. Thumbnail 520 can be dragged and dropped onto a target with which sharable content 504 is to be shared.

Further, as depicted in FIG. 5C, commencement of the dragging operation also causes a list of targets 522 to be displayed. In the embodiment depicted in FIG. 5C, list 522 comprises icons representing various applications including an icon 524 representing a Facebook application, an icon 526 representing a Twitter application, an icon 528 representing an email application, and an icon 530 representing an IM chat. Each icon is a potential target. The user may drag and drop the shared content on any one of these icons to share the content with the application represented by the icon.

Figure 5D:
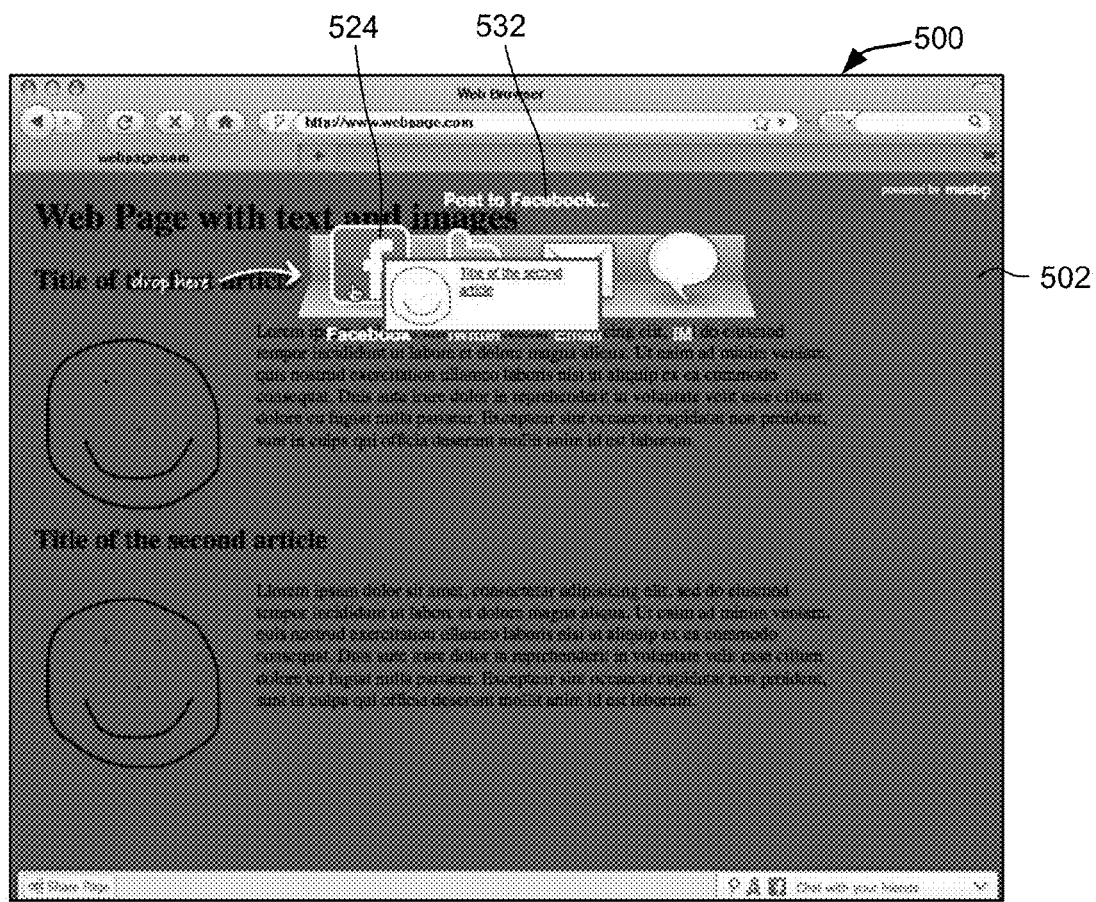
FIG. 5D depicts information that is displayed when a user drags the thumbnail representing sharable content and hovers over a Facebook icon according to an embodiment of the present invention.

The actions that are performed upon sharing web page content with a target may differ from one target to another. In one embodiment, information identifying the action that will be performed may be displayed when a user drags the sharable content (or the thumbnail representing the sharable content) and hovers over a target. For example, FIG. 5D depicts information 532 that is displayed when a user drags the thumbnail representing sharable content and hovers over Facebook icon 524 according to an embodiment of the present invention. Information 532 identifies an action that will be performed upon the user dropping the sharable content on Facebook icon 524. In the case of Facebook, information 532 indicates that information will be posted to Facebook in a manner that enables sharable content 504 to be accessed, viewed, or interacted with from within Facebook.

Figure 5E:
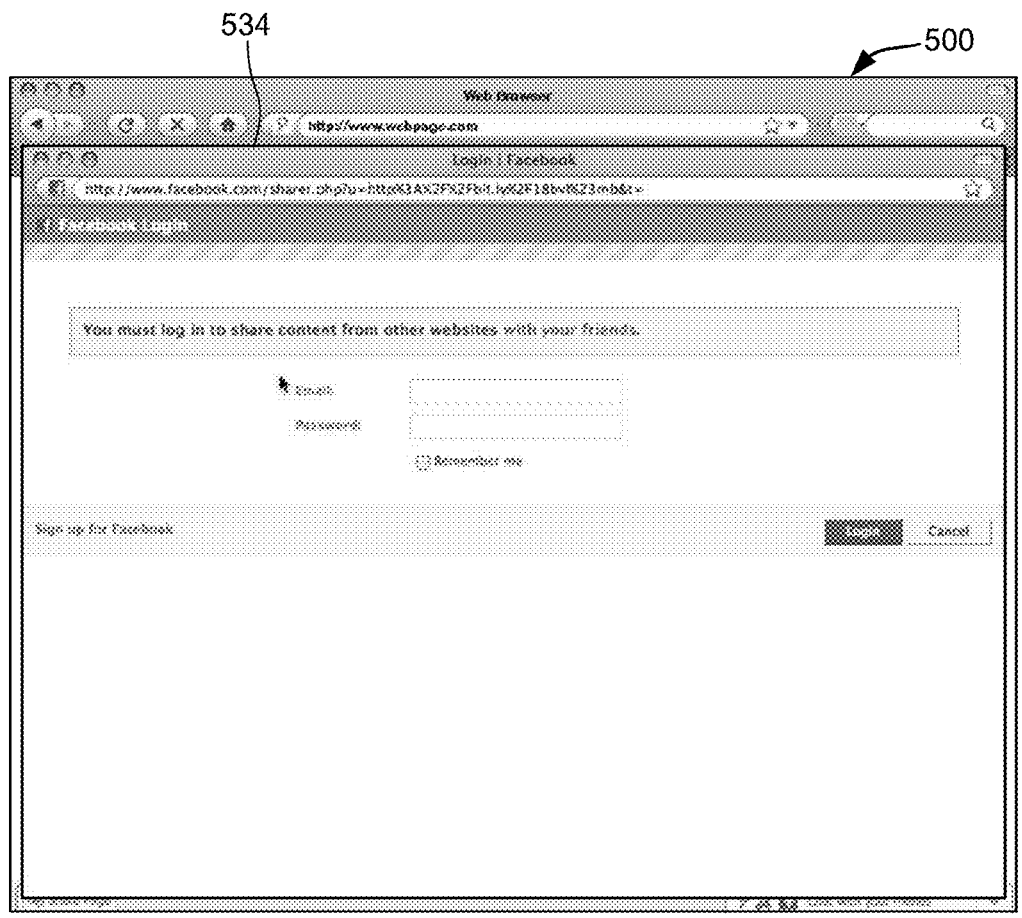
FIG. 5E depicts a window that is displayed when sharable content is shared with Facebook according to an embodiment of the present invention.

FIG. 5E depicts a window 534 that is displayed when sharable content is shared with Facebook according to an embodiment of the present invention. Window 534 may be in the form of a popup window that is displayed when the thumbnail representing the sharable content is dropped onto Facebook icon 524. Window 534 prompts the user to log into Facebook to enable the sharable content to be shared with friends in Facebook. Window 534 may be displayed using APIs provided by Facebook.

Figure 5F:
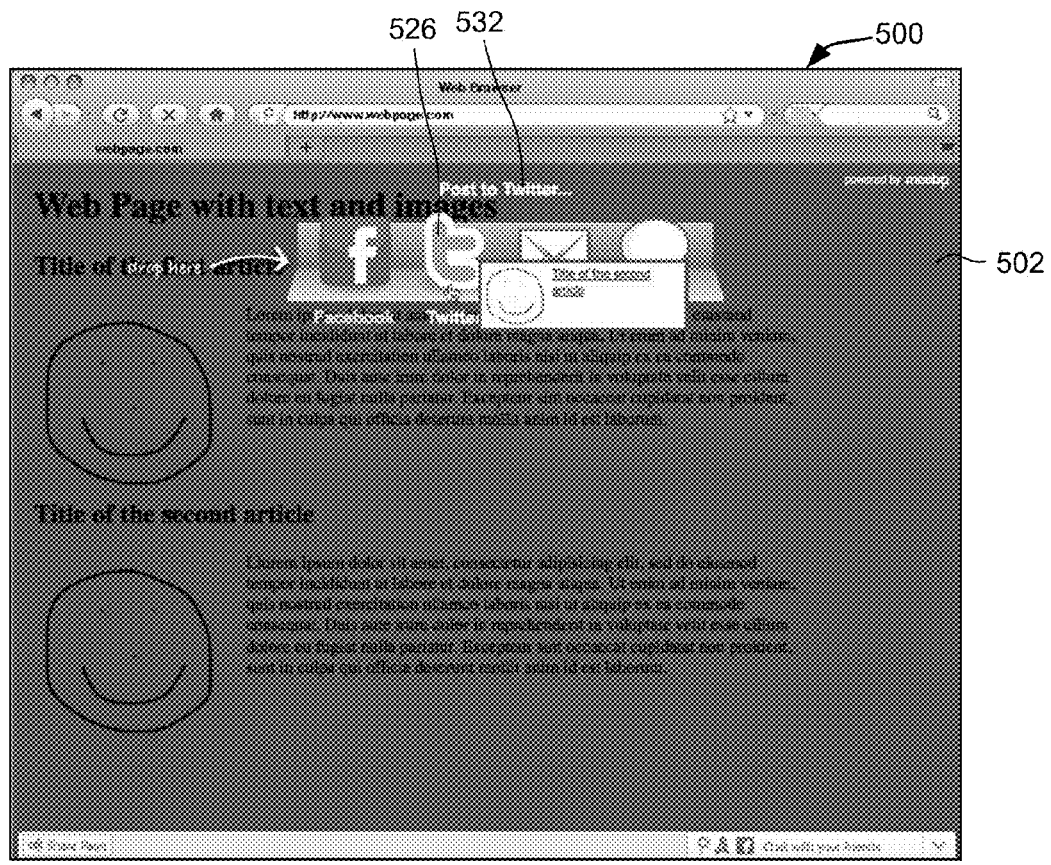
FIG. 5F depicts information that is displayed when a user drags the thumbnail representing the sharable content and hovers over a Twitter icon according to an embodiment of the present invention.

FIG. 5F depicts information 532 that is displayed when a user drags the thumbnail representing the sharable content and hovers over Twitter icon 526 according to an embodiment of the present invention. Information 532 identifies an action that will be performed upon the user dropping the sharable content on Twitter icon 526. In the case of Twitter, information 532 indicates that information will be posted to Twitter in a manner that enables a Twitter user to access, view, or interact with the sharable content from within Twitter.

Figure 5G:
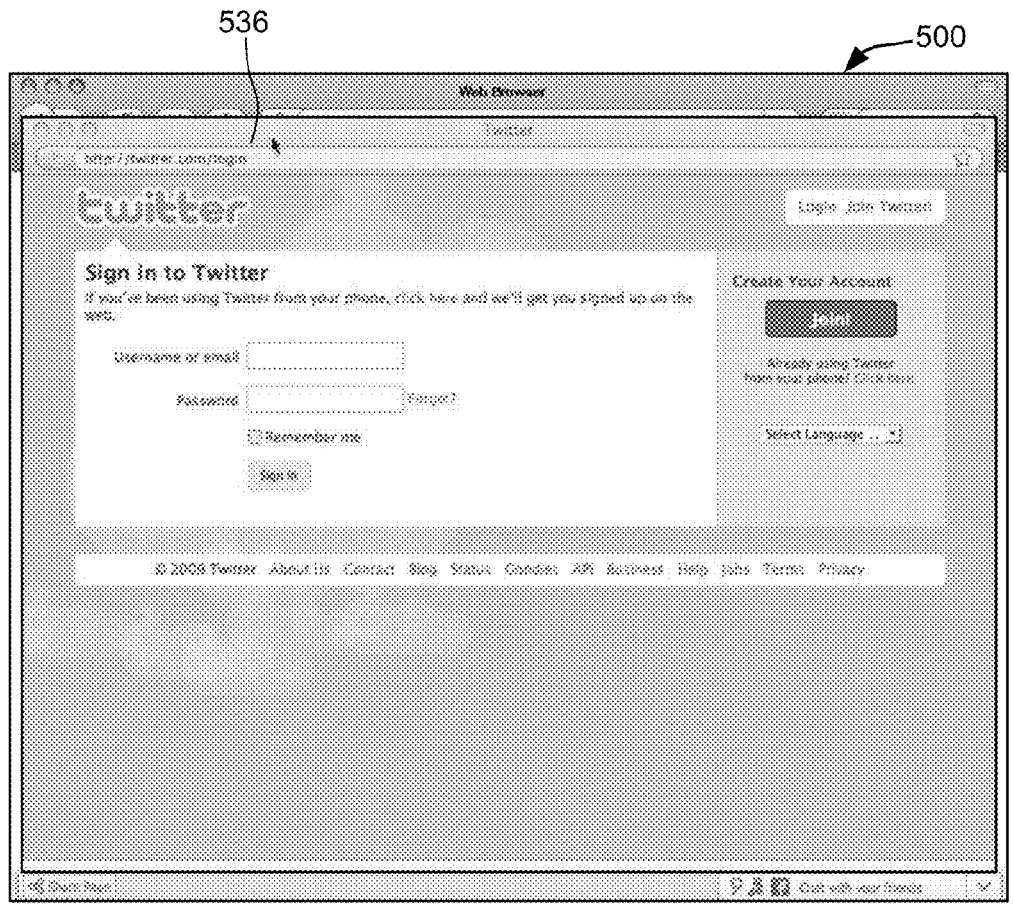
FIG. 5G depicts a window that is displayed when sharable content is shared with Twitter according to an embodiment of the present invention.

FIG. 5G depicts a window 536 that is displayed when sharable content is shared with Twitter according to an embodiment of the present invention. Window 536 may be in the form of a popup window that is displayed when the thumbnail representing the sharable content is dropped onto Twitter icon 526. Window 536 prompts the user to log into Twitter to enable the sharable content to be shared with friends in Twitter. Window 536 may be displayed using APIs provided by Twitter.

Figure 5H:
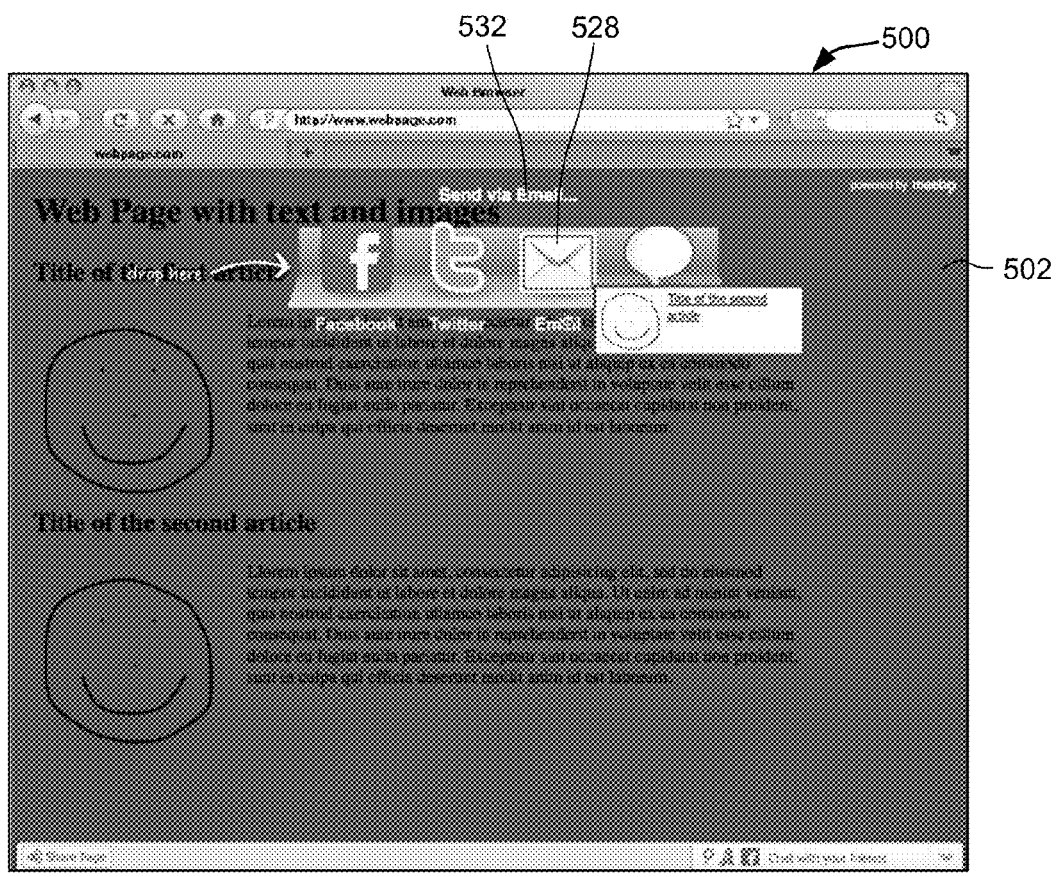
FIG. 5H depicts information that is displayed when a user drags a thumbnail representing sharable content and hovers over an Email icon according to an embodiment of the present invention.

FIG. 5H depicts information 532 that is displayed when a user drags a thumbnail representing sharable content and hovers over Email icon 528 according to an embodiment of the present invention. Information 532 identifies an action that will be performed upon the user dropping the sharable content on icon 528. In the case of Email, information 532 indicates that a message will be sent comprising information that enables the recipient of the email message to access, view, or interact with the sharable content.

Figure 5I:
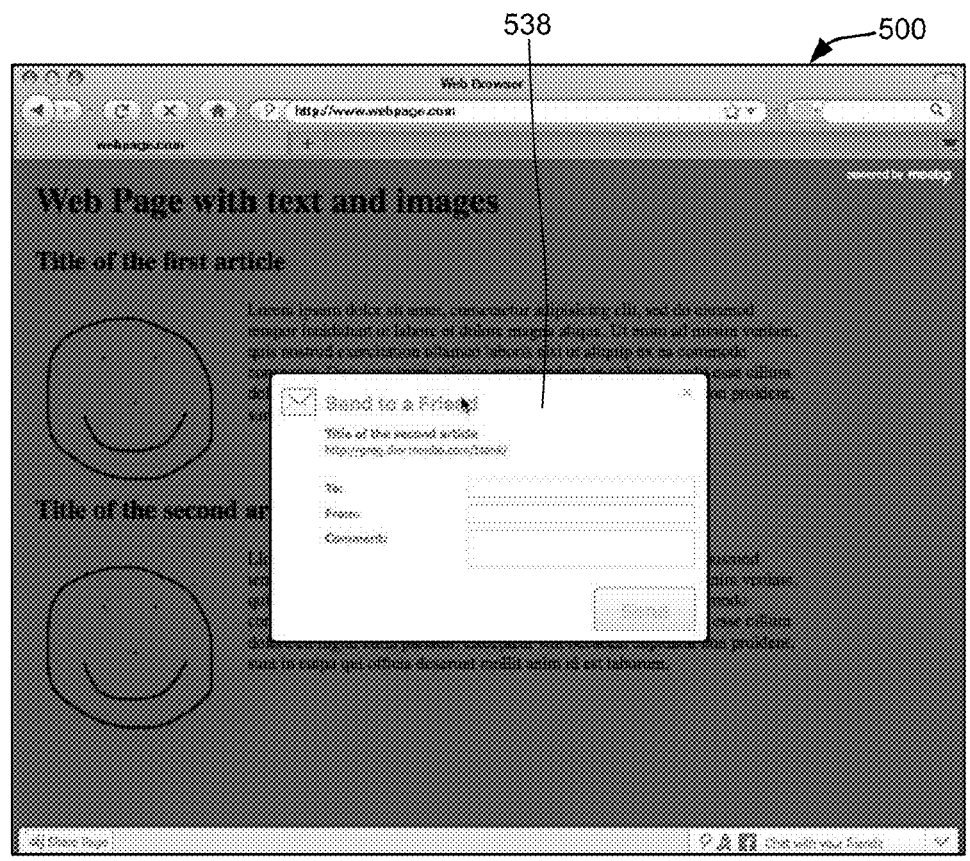
FIG. 5I depicts a window that is displayed when sharable content is shared with an Email application according to an embodiment of the present invention.

FIG. 5I depicts a window 538 that is displayed when sharable content is shared with an Email application according to an embodiment of the present invention. Window 538 may be in the form of a popup window that is displayed when the thumbnail representing the sharable content is dropped onto Email icon 528. Window 538 prompts the user to enter information in "To", "From", and "Comment" fields. The entered information is then used to send an email to the recipient(s) entered in the "To" field such that the recipient(s) can access, view, or interact with the shared content.

Figure 5J:
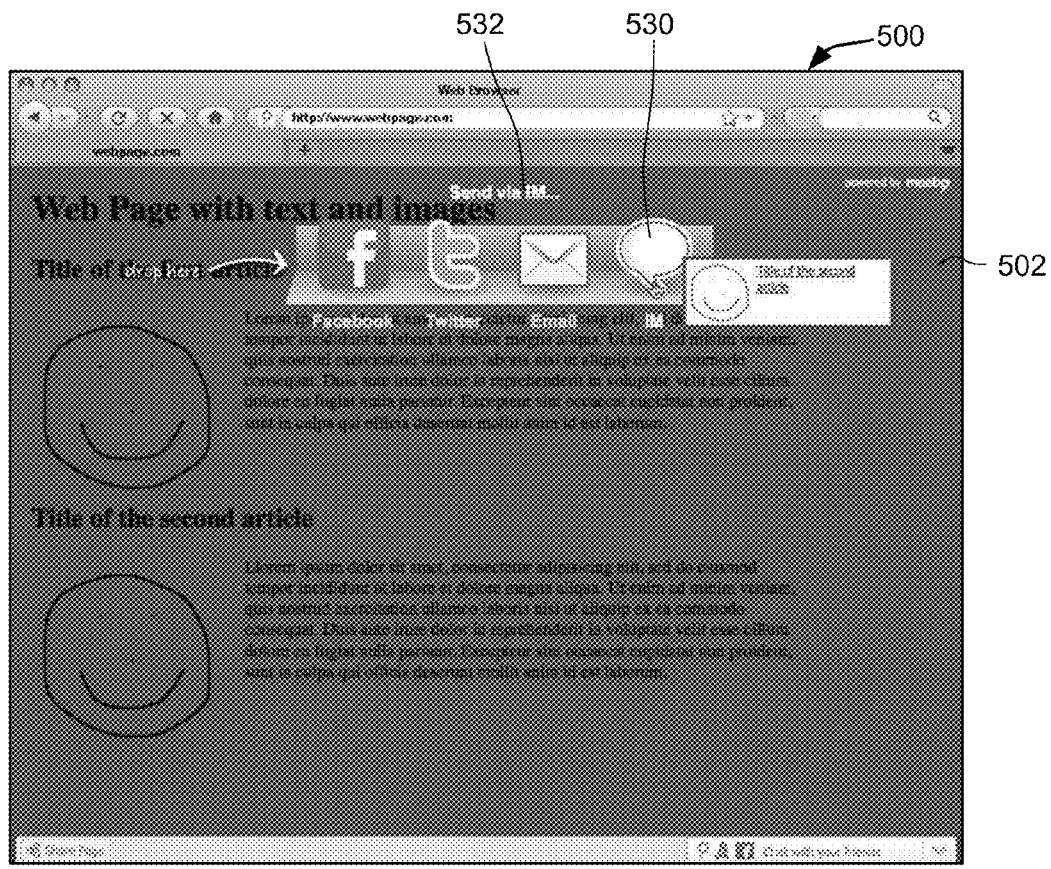
FIG. 5J depicts information that is displayed when a user drags the thumbnail representing sharable content and hovers over an IM icon according to an embodiment of the present invention.

FIG. 5J depicts information 532 that is displayed when a user drags the thumbnail representing sharable content and hovers over IM icon 530 according to an embodiment of the present invention. Information 532 identifies an action that will be performed upon the user dropping the sharable content on icon 530. In the case of IM, information 532 indicates that an IM message will be sent comprising information that enables the recipient of the message to access, view, or interact with the sharable content.

Figure 5K:
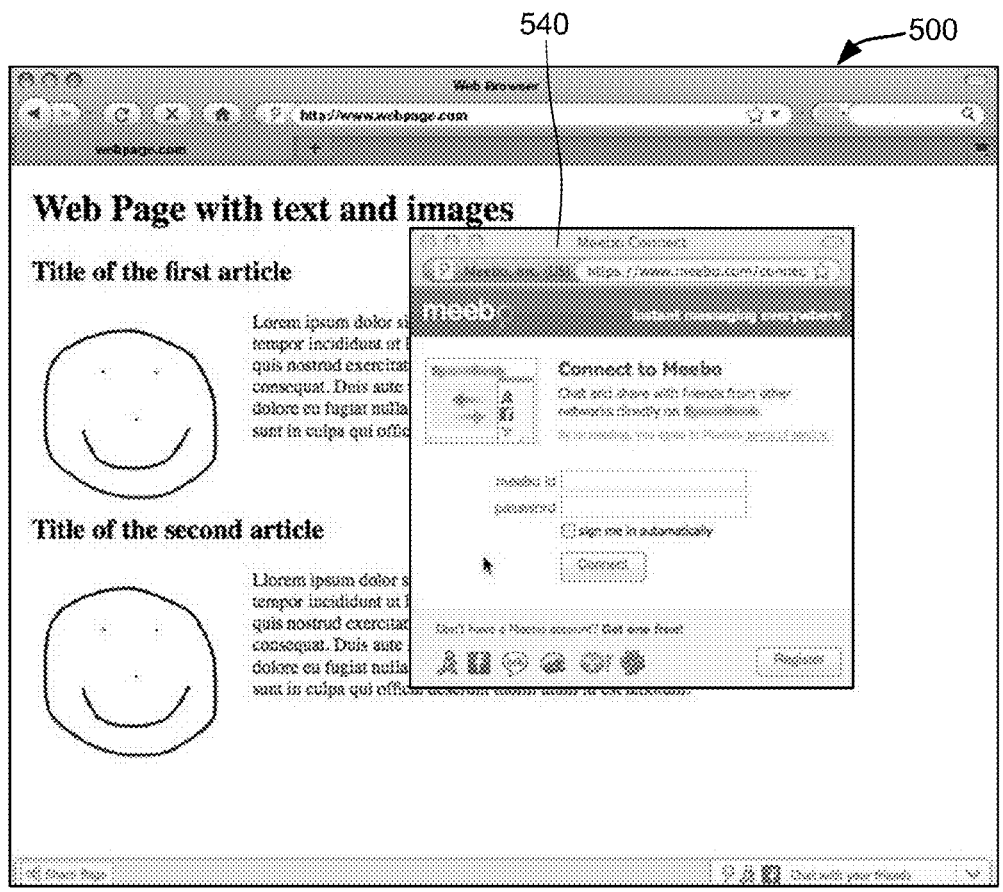
FIG. 5K depicts a window that is displayed when sharable content is shared with an IM application according to an embodiment of the present invention.

FIG. 5K depicts a window 540 that is displayed when sharable content is shared with an IM application according to an embodiment of the present invention. Window 540 may be in the form of a popup window that is displayed when the thumbnail representing the sharable content is dropped onto IM icon 530. Window 540 prompts the user to connect to an IM chat account to enable the sharable content to be shared with the user's IM friends/buddies.

Figure 5L:
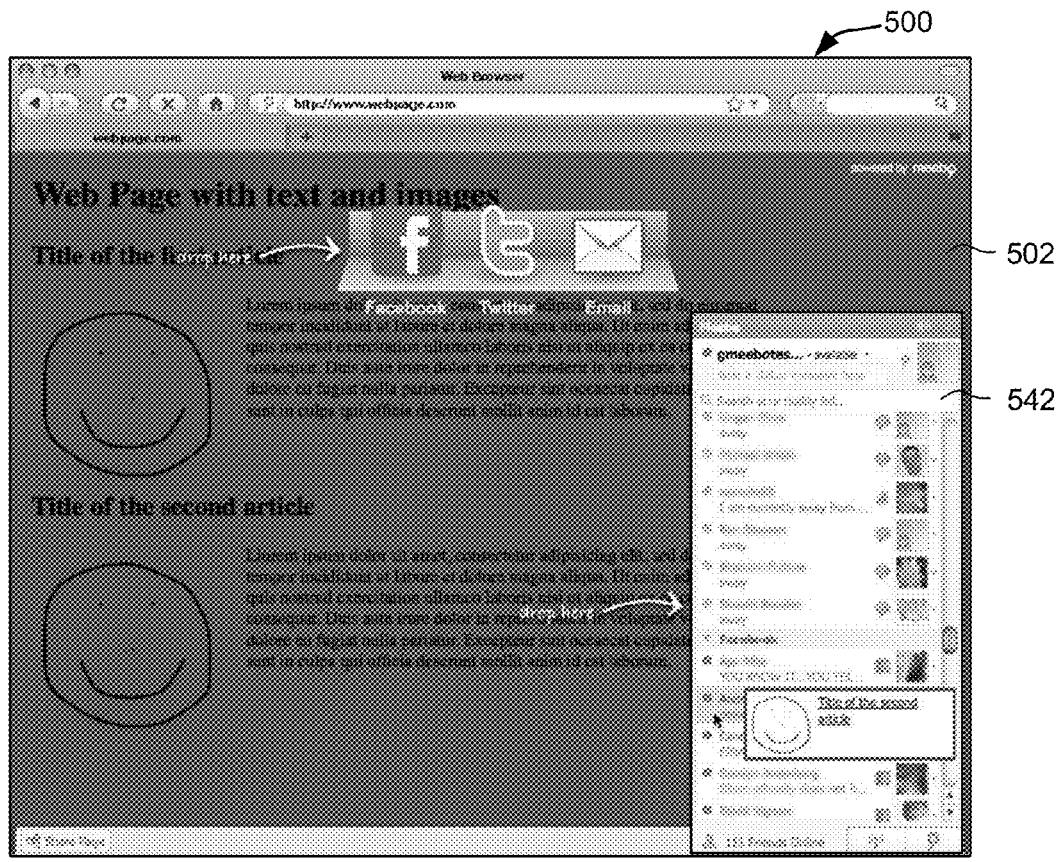
FIG. 5L depicts an IM window that may be opened in response to a user dragging sharable content according to an embodiment of the present invention.

In one embodiment, if a user is already logged into the user's IM account, then commencement of the dragging operation may open up an IM window and display a list of the user's buddies. FIG. 5L depicts an IM window that may be opened in response to a user dragging sharable content according to an embodiment of the present invention. As depicted in FIG. 5L, an IM window 542 is opened in response to a dragging operation. The user may then drop the thumbnail representing the sharable content onto a buddy displayed in window 542. Hovering over a buddy may cause that buddy's name to be highlighted.

Figure 5M:
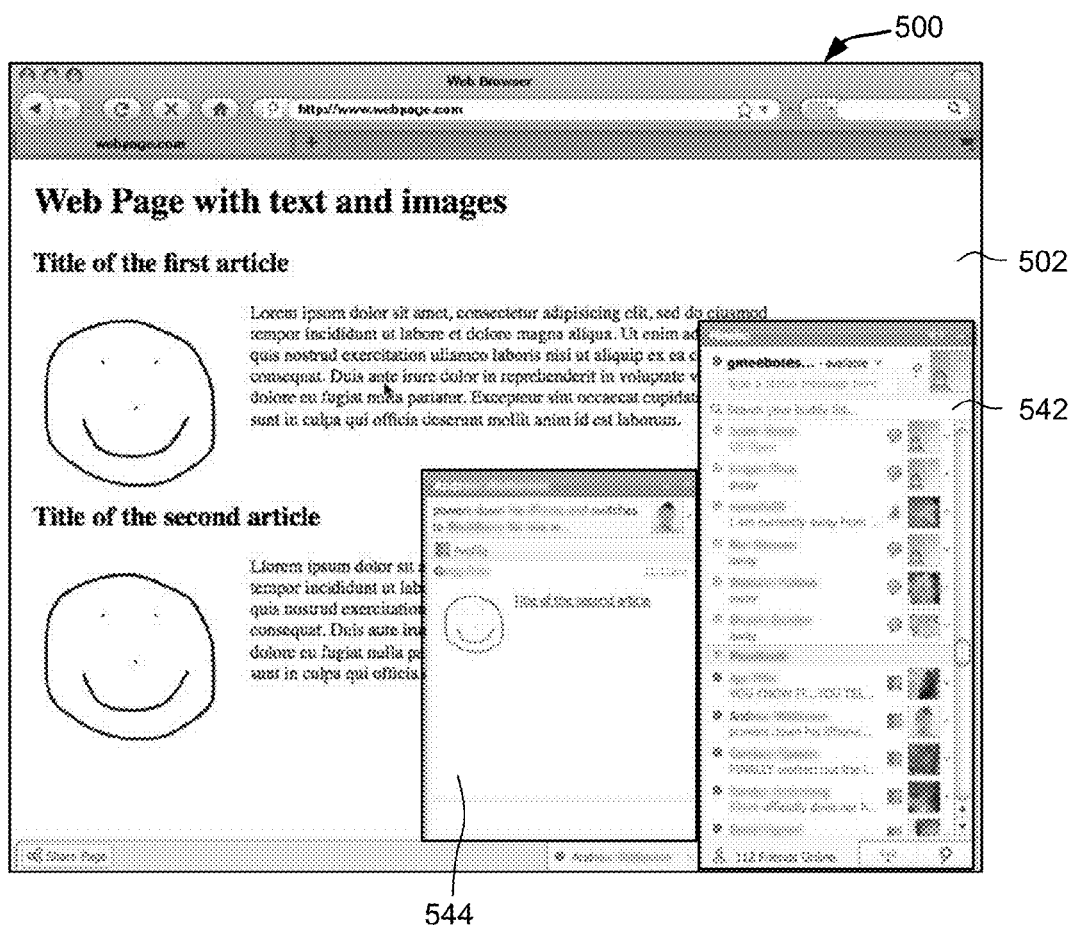
FIG. 5M shows the results of sharing content with an IM buddy according to an embodiment of the present invention.

FIG. 5M shows the results of sharing content with an IM buddy according to an embodiment of the present invention. In the embodiment depicted in FIG. 5M, sharing web page content with an IM buddy causes a chat window 544 to be opened for the buddy. Information is posted to the chat window that enables the buddy to access, view, or interact with the shared content. For example, as shown in FIG. 5M, the shared content is sent to the buddy as an IM message.

Figure 6:
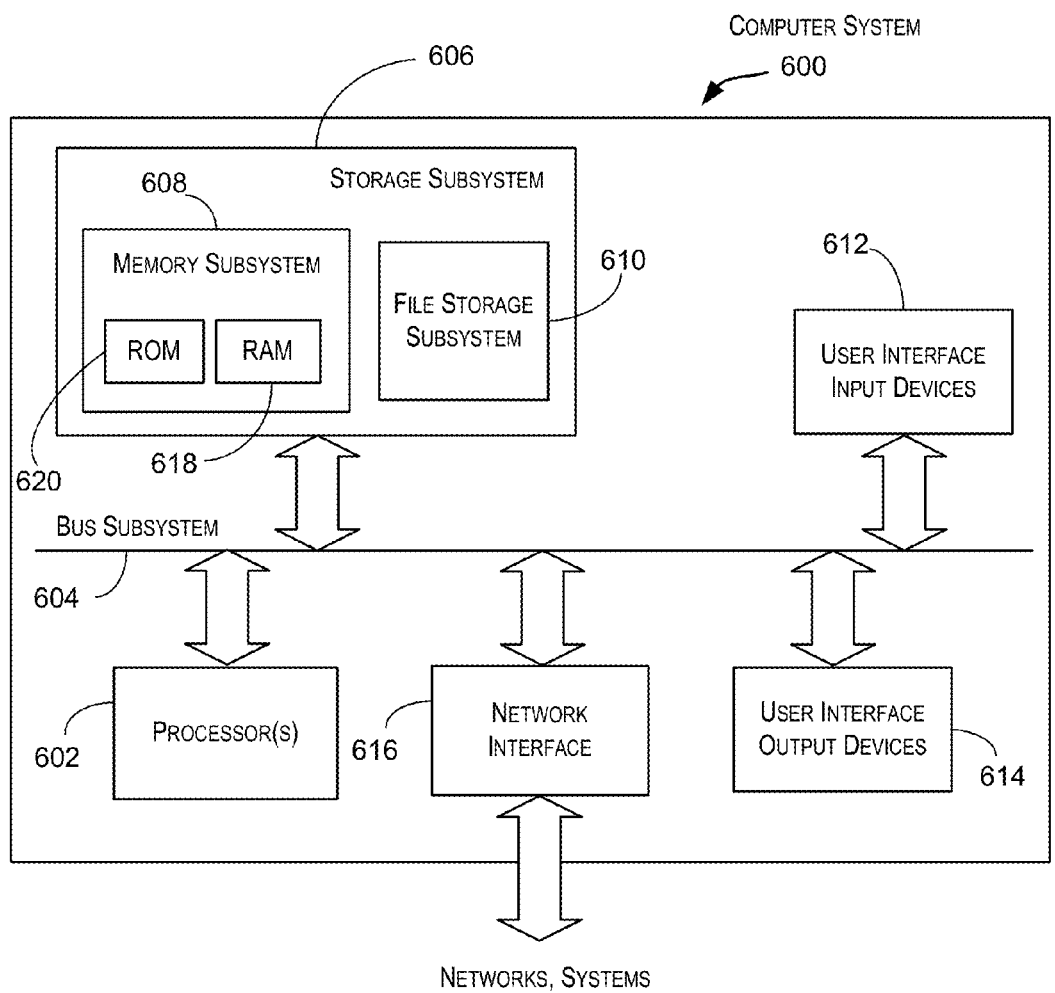
FIG. 6 is a simplified block diagram of a computer system that may be used to practice an embodiment of the present invention.

FIG. 6 is a simplified block diagram of a computer system 600 that may be used to practice an embodiment of the present invention. In various embodiments, computer system 600 may be used to implement any of the computers or systems illustrated in FIG. 1 described above. For example, computer system 600 may be used to implement user system 106. As shown in FIG. 6, computer system 600 includes a processor 602 that communicates with a number of peripheral subsystems via a bus subsystem 604. These peripheral subsystems may include a storage subsystem 606, comprising a memory subsystem 608 and a file storage subsystem 610, user interface input devices 612, user interface output devices 614, and a network interface subsystem 616.

Bus subsystem 604 provides a mechanism for letting the various components and subsystems of computer system 600 communicate with each other as intended. Although bus subsystem 604 is shown schematically as a single bus, alternative embodiments of the bus subsystem may utilize multiple busses.

Network interface subsystem 616 provides an interface to other computer systems and networks. Network interface subsystem 616 serves as an interface for receiving data from and transmitting data to other systems from computer system 600. For example, network interface subsystem 616 may enable a user computer to connect to the Internet and facilitate communications using the Internet.

User interface input devices 612 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 600.

User interface output devices 614 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 provides a computer-readable storage medium for storing the basic programming and data constructs that provide the functionality of the present invention. Software (programs, code modules, instructions) that when executed by a processor provide the functionality of the present invention may be stored in storage subsystem 606. These software modules or instructions may be executed by processor(s) 602. Storage subsystem 606 may also provide a repository for storing data used in accordance with the present invention. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 600 can be of various types including a personal computer, a portable computer, a workstation, a network computer, a mainframe, a kiosk, a server or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A non-transitory computer-readable storage memory storing a plurality of instructions for controlling a processor, the plurality of instructions comprising:
    instructions that cause the processor to identify, from a set of content elements contained by a web page loaded in a browser, a first content element of the webpage having a content type and a first tag;
    instructions that cause the processor to determine whether the first content element of the webpage satisfies one or more pre-defined selection criteria associated with the content type, the satisfaction of the one or more pre-defined selection criteria indicating that the first content element of the webpage having the content type is configured to be shared with a target, the one or more pre-defined selection criteria including one or more requirements for configuring the first content element of the webpage to be shared with the target based upon one or more attribute values associated with the first tag; and
    instructions that cause the processor to configure the first content element of the webpage to be shared with the target responsive to determining that the first content element of the webpage satisfies the one or more pre-defined selection criteria based upon one or more attribute values associated with the first tag and wherein the instructions that cause the processor to configure the first content element of the webpage to be shared with the target comprise instructions that cause the processor to configure the first content element of the webpage to be shared with the target by dragging and dropping the first content element of the webpage onto a representation of the target.

2. The computer-readable storage memory of claim 1 wherein the instructions that cause the processor to identify the first content element of the webpage comprise:
    instructions that cause the processor to scan the web page to identify a first set of tags, each tag corresponding to a content element of the web page to be made sharable, the first set of tags including the first tag corresponding to the first content element of the webpage.

3. The computer-readable storage memory of claim 2 wherein the instructions that cause the processor to determine whether the first content element of the webpage satisfies the one or more pre-defined selection criteria further comprise:
    instructions that cause the processor to determine, based upon one or more attributes of the first tag, whether the one or more pre-defined selection criteria are satisfied; and
    instructions that cause the processor to select the first tag from the first set of tags responsive to determining that the one or more pre-defined selection criteria are satisfied based upon the one or more attributes of the first tag.

4. The computer-readable storage memory of claim 1 wherein the plurality of instructions further comprises:
    instructions that cause the processor to visually highlight the first content element of the webpage.

5. The computer-readable storage memory of claim 4 wherein instructions that cause the processor to visually highlight comprise:
  instructions that cause the processor to detect a mouse-related event associated with the first content element of the webpage; and
  instructions that cause the processor to visually highlight the first content element of the webpage upon detection of the mouse-related event.

6. The computer-readable storage memory of claim 1 wherein the plurality of instructions further comprises:
  instructions that cause the processor to detect that the first content element of the webpage has been shared with the target; and
  instructions that cause the processor to provide information to the target that enables the target to perform one or more of accessing, viewing and interacting with the first content element of the webpage.

7. The computer-readable storage memory of claim 6 wherein the information provided to the target comprises a uniform resource locator (URL) that enables the target to access the first content element of the webpage.

8. The computer-readable storage memory of claim 6 wherein:
  the instructions that cause the processor to detect that the first content element of the webpage has been shared with the target comprise instructions that cause the processor to detect that the target is an element of an instant messaging application; and
  the instructions that cause the processor to provide the information to the target comprise instructions that cause the processor to send a message to an entity corresponding to the element of the instant messaging application that enables the entity to perform one or more of accessing, viewing and interacting with the first content element of the webpage.

9. The computer-readable storage memory of claim 1 wherein the plurality of instructions further comprises:
  instructions that cause the processor to execute a first code associated with the web page, wherein execution of the first code causes the instructions that cause the processor to identify the first content element of the webpage, the instructions that cause the processor to determine whether the first content element of the webpage satisfies the one or more pre-defined selection criteria and the instructions that cause the processor to configure the first content element of the webpage to be shared with the target to be executed.

10. A system comprising:
  a memory; and
  a processor coupled to the memory, the processor configured to:
    identify, from a set of content elements contained by a web page loaded in a browser, a first content element of the webpage having a content type and a first tag;
    determine whether the first content element of the webpage satisfies one or more pre-defined selection criteria associated with the content type, the satisfaction of the one or more pre-defined selection criteria indicating that the first content element of the webpage having the content type is configured to be shared with a target, the one or more pre-defined selection criteria including one or more requirements for configuring the first content element of the webpage to be shared with the target based upon one or more attribute values associated with the first tag; and
    configure the first content element of the webpage to be shared with the target responsive to determining that the first content of the webpage element satisfies the one or more selection criteria based upon one or more attribute values associated with the first tag and wherein the instructions that cause the processor to configure the first content element of the webpage to be shared with the target comprise instructions that cause the processor to configure the first content element of the webpage to be shared with the target by dragging and dropping the first content element of the webpage onto a representation of the target.

11. The system of claim 10 wherein the processor is configured to scan the web page to identify a first set of tags, each tag corresponding to a content element of the web page to be made sharable, the first set of tags including the first tag corresponding to the first content element of the webpage.

12. The system of claim 11 wherein the processor is configured to determine whether the first content element of the webpage satisfies the one or more pre-defined selection criteria by:
  determining, based upon one or more attributes of the first tag, whether the one or more pre-defined selection criteria are satisfied; and
  selecting the first tag from the first set of tags responsive to determining that the one or more pre-defined selection criteria are satisfied based upon the one or more attributes of the first tag.

13. The system of claim 10 wherein the processor is configured to visually highlight the first content element of the webpage upon detecting an event associated with the first content element of the webpage.

14. The system of claim 10 wherein the processor is configured to:
  detect that the first content element of the webpage has been shared with the target; and
  provide information to the target that enables the target to perform one or more of accessing, viewing and interacting with the first content element of the webpage.

15. The system of claim 14 wherein the information provided to the target comprises a uniform resource locator (URL) that enables the target to access the first content element of the webpage.

16. The system of claim 14 wherein the processor is configured to:
  detect that the target is an element of an instant messaging application; and
  send a message to an entity corresponding to the element of the instant messaging application that enables the entity to perform one or more of accessing, viewing and interacting with the first content element of the webpage.

17. The system of claim 10 wherein the processor is configured to execute a first code associated with the web page, wherein execution of the first code causes the processor to identify the first content element of the webpage, to determine whether the first content element of the webpage satisfies the one or more pre-defined selection criteria and to configure the first content element of the webpage to be shared with the target.

18. A method comprising:
  determining, by at least one computing device, that a first tag included in a web page corresponds to a first content element of the web page, the first content element of the webpage having a content type;
  determining, by the at least one computing device, whether the first content element of the webpage satisfies one or more pre-defined selection criteria associated with the content type, the satisfaction of the one or more predefined selection criteria indicating that the first content element of the webpage having the content type is configured to be shared with a target, the one or more predefined selection criteria including one or more requirements for configuring the first content element of the webpage to be shared with the target based upon one or more attribute values associated with the first tag; and adding, by the at least one computing device, one or more event handlers to the first tag responsive to determining that the first content element of the webpage satisfies the one or more predefined selection criteria based upon one or more attribute values associated with the first tag, the one or more event handlers being configured to allow the target, with which the first content element of the webpage is shared, to perform one or more of accessing, viewing and interacting with the first content element of the webpage by dragging and dropping the first content element of the web page onto a representation of the target.

19. The method of claim 18, further comprising:

in response to detecting that the first content element of the webpage has been shared with the target, providing information to the target that enables the target to perform the one or more of accessing, viewing and interacting with the first content element of the webpage.

20. The method of claim 18, wherein determining that the first tag included in the web page corresponds to the first content element of the web page includes automatically scanning the web page to identify a first set of tags, each tag corresponding to a content element of the web page to be made sharable, the first set of tags including the first tag corresponding to the first content element of the webpage.

* * * * *